US011938608B2

(12) United States Patent
Hatakeyama

(10) Patent No.: US 11,938,608 B2
(45) Date of Patent: Mar. 26, 2024

(54) WORKING MACHINE

(71) Applicant: KOKI HOLDINGS CO., LTD., Tokyo (JP)

(72) Inventor: Kentaro Hatakeyama, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 294 days.

(21) Appl. No.: 17/298,168

(22) PCT Filed: Oct. 25, 2019

(86) PCT No.: PCT/JP2019/041963
§ 371 (c)(1),
(2) Date: May 28, 2021

(87) PCT Pub. No.: WO2020/110543
PCT Pub. Date: Jun. 4, 2020

(65) Prior Publication Data

US 2022/0118596 A1 Apr. 21, 2022

(30) Foreign Application Priority Data

Nov. 30, 2018 (JP) ................................ 2018-226119

(51) Int. Cl.
*B25F 5/02* (2006.01)
*B24B 23/02* (2006.01)
*B24B 47/12* (2006.01)

(52) U.S. Cl.
CPC ................ *B25F 5/02* (2013.01); *B24B 23/02* (2013.01); *B24B 47/12* (2013.01)

(58) Field of Classification Search
CPC ............ B25F 5/02; B24B 23/02; B24B 47/12
See application file for complete search history.

(56) References Cited

U.S. PATENT DOCUMENTS 3,217,559 A * 11/1965 Elligson .................. H01H 9/20 200/293.1
3,847,233 A * 11/1974 Glover ..................... H01H 3/20 200/318.2

(Continued)

FOREIGN PATENT DOCUMENTS

CN 101791777 A 8/2010
CN 102015218 A 4/2011

(Continued)

OTHER PUBLICATIONS

International Search Report and Written Opinion dated Jan. 21, 2020 by the International Searching Authority (Japan Patent Office) in PCT Application PCT/JP2019/041963 (English Translation of the ISR).

(Continued)

*Primary Examiner* — Anna K Kinsaul
*Assistant Examiner* — Lucas E. A. Palmer
(74) *Attorney, Agent, or Firm* — NovoTechIP International PLLC

(57) ABSTRACT

A working machine includes a housing, a motor, an operating part, and an on-locking unit. The motor is accommodated in the housing. The operating part is a part of the housing. The operating part is movable between an on position and an off position. The motor is driven when the operating part is in the on position, and is stopped when the operating part is in the off position. The on-locking element is configured to maintain the operating part in the on position. At least a portion of the on-locking element is accommodated inside of the housing so as not to be operable when the operating part is in the off position. The portion of the on-locking unit is positioned outside of the housing such that the on-locking unit becomes operable when the operating part is in the on position.

15 Claims, 15 Drawing Sheets

(56) References Cited

U.S. PATENT DOCUMENTS

| | | | | | |
|---|---|---|---|---|---|
| 3,854,020 | A * | 12/1974 | Glover | H01H 3/20 200/522 |
| 4,180,716 | A * | 12/1979 | Suzuki | H01H 9/06 200/522 |
| 4,879,438 | A * | 11/1989 | Winchester | H01H 9/06 310/50 |
| 5,595,532 | A * | 1/1997 | McCracken | B25F 5/02 451/357 |
| 5,638,945 | A * | 6/1997 | Fukinuki | H01H 3/20 200/321 |
| 5,642,008 | A * | 6/1997 | McCracken | H02K 11/33 451/357 |
| 6,290,587 | B1 * | 9/2001 | McCracken | B25F 5/02 451/357 |
| 9,902,056 | B2 * | 2/2018 | Kaupp | B23Q 11/0089 |
| 10,195,703 | B2 * | 2/2019 | Boeck | B25F 5/00 |
| 2005/0196273 | A1 * | 9/2005 | Nishikawa | H02K 9/06 415/206 |
| 2010/0175972 | A1 * | 7/2010 | Kimata | H01H 9/282 200/318.1 |
| 2011/0005905 | A1 * | 1/2011 | Fukinuki | B25F 5/02 200/43.18 |
| 2011/0168422 | A1 * | 7/2011 | Fujiwara | B24B 23/028 173/217 |
| 2011/0227429 | A1 | 9/2011 | Takeda et al. | |
| 2013/0081287 | A1 * | 4/2013 | Moreno | B27B 9/02 30/390 |
| 2013/0161161 | A1 * | 6/2013 | Parrinello | B25F 5/00 200/43.17 |
| 2013/0277189 | A1 * | 10/2013 | Yuan | H01H 3/20 200/332 |
| 2015/0170848 | A1 * | 6/2015 | Kannan | H01H 3/20 200/43.17 |
| 2017/0125192 | A1 * | 5/2017 | Hanai | H01H 21/00 |
| 2017/0358909 | A1 * | 12/2017 | Ballard | B25F 5/02 |
| 2018/0093335 | A1 * | 4/2018 | Hart | H01H 3/20 |
| 2018/0182577 | A1 | 6/2018 | Karlovic | |
| 2019/0198270 | A1 * | 6/2019 | Wong | H01H 19/635 |
| 2019/0358801 | A1 * | 11/2019 | McCue | B25F 3/00 |
| 2022/0415584 | A1 * | 12/2022 | Chiasson | H01H 9/24 |

FOREIGN PATENT DOCUMENTS

| | | | |
|---|---|---|---|
| CN | 103878752 | A | 6/2014 |
| CN | 104552182 | A | 4/2015 |
| DE | 102013212907 | A1 | 1/2015 |
| JP | 2008-119755 | A | 5/2008 |
| JP | 2011143492 | A | 7/2011 |
| JP | 2017080844 | A | 5/2017 |
| WO | 2009/135338 | A | 11/2009 |
| WO | 2018230707 | A1 | 12/2018 |

OTHER PUBLICATIONS

European Search Report dated Oct. 25, 2022 in corresponding European Patent Application No. 19888434.8.

Office Action dated Sep. 7, 2022 in corresponding Chinese Patent Application No. 201980078580.7.

International Preliminary Report on Patentability dated May 25, 2021 by the International Bureau of WIPO in PCT Application PCT/JP2019/041963.

* cited by examiner

UP
FRONT REAR
DOWN (a)

UP
FRONT REAR
DOWN (b)

(a)

(b)

WORKING MACHINE

TECHNICAL FIELD

The present invention relates to a working machine.

BACKGROUND ART

In disc grinders and other power tools known in the art, a motor switch is turned on by gripping a switch lever provided on the housing of the power tool and the drive force of the motor rotates a tool attached to the device body. A proposed structure for this type of power tool is provided with off-locking means for holding the motor switch in the off state so that the operator does not unintentionally turn the motor switch on, and on-locking means for maintaining the motor switch in the ON state (for example, see Patent Literature 1).

CITATION LIST

Patent Literature

[PTL 1] Japanese Patent Application Publication No. 2011-143492

SUMMARY OF INVENTION

Technical Problem

However, in the power tool of Patent Literature 1, an on-lock lever constituting the on-locking means is configured to be exposed from the housing at all times so that an operating force can be exerted on the on-lock lever even before performing the operation to turn on the motor. Therefore, when the operator turns on the motor switch while exerting an operating force on the on-lock lever, the operator could enable the on-lock unintentionally. Further, while it is effective to arrange the operating locations of the off-locking means and on-locking means at different positions to suppress mistaken on-locking operations, the on-locking means in the configuration described in Patent Literature 1 is positioned rearward of the switch lever. Accordingly, the operator must operate the off-locking means and switch lever with one hand while operating the on-locking means with the other hand. In such cases, the operator's grip can become unstable.

In view of the foregoing, it is an object of the present invention to provide a power tool configured to prevent the operator from enabling the on-lock unintentionally when the motor switch is in the ON state. It is another object of the present invention to provide a power tool having on-locking means with good usability.

Solution to Problem

In order to attain the object, the present invention provides a working machine including a housing, a motor, an operating part, and an on-locking means. The motor is accommodated in the housing. The operating part is a part of the housing. The operating part is movable between an on position and an off position. The motor is driven when the operating part is in the on position. The motor is stopped when the operating part is in the off position. The on-locking means is supported by the housing so as to be movable between an on-lock position and an on-lock release position. The on-locking means maintains the operating part in the on position when the on-locking means is in the on-lock position. The on-locking means releases an on-lock to the operating part when the on-locking means is in the on-lock release position. At least a portion of the on-locking means is accommodated inside of the housing prior to performing an operation to turn on the motor. The portion of the on-locking means is positioned outside of the housing by performing the operation to turn on the motor and such that the on-locking means becomes operable.

This configuration enhances usability by suppressing the operator from unintentionally enabling the on-lock for maintaining the working machine in the on position.

The present invention further provides a working machine including a housing, a motor, an operating part, an on-locking means. The motor is accommodated in the housing. The operating part is supported by the housing. The operating part is movable between an on position and an off position. The motor is driven when the operating part is in the on position. The motor is stopped when the operating part is in the off position. The on-locking means is supported by the housing so as to be movable between an on-lock position and an on-lock release position. The on-locking means maintains the operating part in the on position when the on-locking means is in the on-lock position. The on-locking means releases an on-lock to the operating part when the on-locking means is in the on-lock release position. The on-locking means protrudes from the housing at least when the operating part is in the on position. At least a portion of the on-locking means is configured to be accommodated inside of the housing. A volume of the portion positioned inside of the housing is configured to vary according to the position of the operating part. In a state where the on-locking means is not operated, a protruding amount of the on-locking means protruding from the housing when the operating part is in the on position is greater than a protruding amount of the on-locking means protruding from the housing when the operating part is in the off position.

With this structure, the amount that the on-locking means protrudes from the housing when the operating part is in the off position is smaller than the amount that the on-locking means protrudes from the housing when the operating part is in the on position. Because applying force to the on-lock lever is more difficult when the operating part is in the off position than when the operating part is in the on position, this configuration reduces the likelihood that the operator will enable the on-lock unintentionally while the operating part is in the on position and cause the operating part to be maintained in the on position, thereby enhancing usability.

In the above-described structure, it is preferable that the working machine further includes a shielding part provided on an outer peripheral wall of the housing so as to form an internal space between the shielding part and the housing. An entire part of the on-locking means is accommodated in the internal space when the operating part is in the off position.

With this structure, when the operating part is in the off position, the entire part of the on-locking means is accommodated in the internal space. Since the on-locking means is accommodated in the internal space and cannot be operated at this time, this configuration enhances usability by preventing the operating part from being in an on-lock state when moving the operating part into the on position by the operator's operation and by suppressing the operator from unintentionally enabling the on-lock for maintaining the working machine in the on position.

In the above-described structure, it is preferable that the portion of the on-locking means protrudes outward from the shielding part when the housing and the operating part is in the on position.

In the above-described structure, it is preferable that the operating part has the shielding part.

In the above-described structure, it is preferable that the shielding part is formed with a through-hole. The portion of the on-locking means protrudes outward from the shielding part through the through-hole when the operating part is in the on position.

In the above-described structure, it is preferable that the working machine further includes an off-locking means supported by the housing so as to be movable between an off-lock position and an off-lock release position. The off-locking means maintains the operating part in the off position when the off-locking means is in the off-lock position. The off-locking means allows the operating part to be movable to the on position when the off-locking means is in the off-lock releasing position. A protruding amount of the off-locking means protruding from the housing when the off-locking means is in the off-lock position is smaller than a protruding amount of the on-locking means protruding from the housing when the off-locking means is in the off-lock release position.

This configuration enhances usability by suppressing the operator from unintentionally enabling the on-lock for maintaining the working machine in the on position by keeping the operating part in the off position by off-locking means.

In the above-described structure, it is preferable that the off-locking means is pivotally movably supported by the housing.

In the above-described structure, it is preferable that the off-locking means is slidably movably supported by the housing.

In the above-described structure, it is preferable that the operating part is configured to be movable between the on position and the off position when the off-locking means is in the off-lock release position and the on-locking means is in the on-lock release position.

In the above-described structure, it is preferable that a moving direction of the off-locking means when the off-locking means moves from the off-lock release position toward the off-lock position is opposite to a moving direction of the on-locking means when the on-locking means moves from the on-lock release position toward the off-lock position.

With this structure, the moving direction of the off-locking means to enable the off-lock is different from the moving direction of the off-locking means to enable the on-lock. Hence, this configuration avoids the user confusing operations of the off-locking means with operations of the on-locking means, thereby further enhancing usability.

In the above-described structure, it is preferable that the motor has a rotational shaft extending in the longitudinal direction. The on-locking means and the off-locking means are disposed at opposite sides of the rotational shaft.

With this structure, the off-locking means is provided on the outer wall of the housing on the side opposite to the on-locking means. This arrangement prevents the operator from confusing operations of the on-locking means and off-locking means, thereby further enhancing usability.

The present invention further provides a working machine including a housing, a motor, an operating part, an on-locking means, an off-locking means, and a mounting part. The motor is accommodated in the housing. The operating part is supported by the housing. The operating part is movable between an on position and an off position. The motor is driven when the operating part is in the on position. The motor is stopped when the operating part is in the off position. The on-locking means is supported by the housing so as to be movable between an on-lock position and an on-lock release position. The on-locking means maintains the operating part in the on position when the on-locking means is in the on-lock position. The on-locking means releases an on-lock to the operating part when the on-locking means is in the on-lock release position. An off-locking means is supported by the housing so as to be movable between an off-lock position and an off-lock release position. The off-locking means maintains the operating part in the off position when the off-locking means is in the off-lock position. The off-locking means allows the operating part to be movable to the on position when the off-locking means is in the off-lock releasing position. The mounting part is supported by one end portion in a longitudinal direction of the housing. The mounting part is configured to be rotated upon receiving the rotating force from the motor. The mounting part is capable of mounting an end bit. The on-locking means is positioned closer to the mounting part in the longitudinal direction than the off-locking means is to the mounting part in the longitudinal direction.

With this structure, with holding the front at which the mounting part of the working machine is provided with one hand, the operator can easily perform a sequence of operations, including, in order, releasing the off-lock, moving the operating part to the on position, and enabling the on-lock, with the other hand. In other words, since the on-locking means is closer to the mounting part than the off-locking means is to the mounting part, the position of the on-locking means for enabling the on-lock which is the final step of the above operations corresponds to the position of the hand of the operator who operates the switch lever, thereby enhancing usability.

Advantageous Effects of Invention

According to a working machine of the present invention, preventing the operator from enabling the on-lock unintentionally when the motor switch is in the on state can be achieved. Further, according to the present invention, providing a working machine with good usability can be achieved.

DESCRIPTION OF EMBODIMENTS

Figure 1:
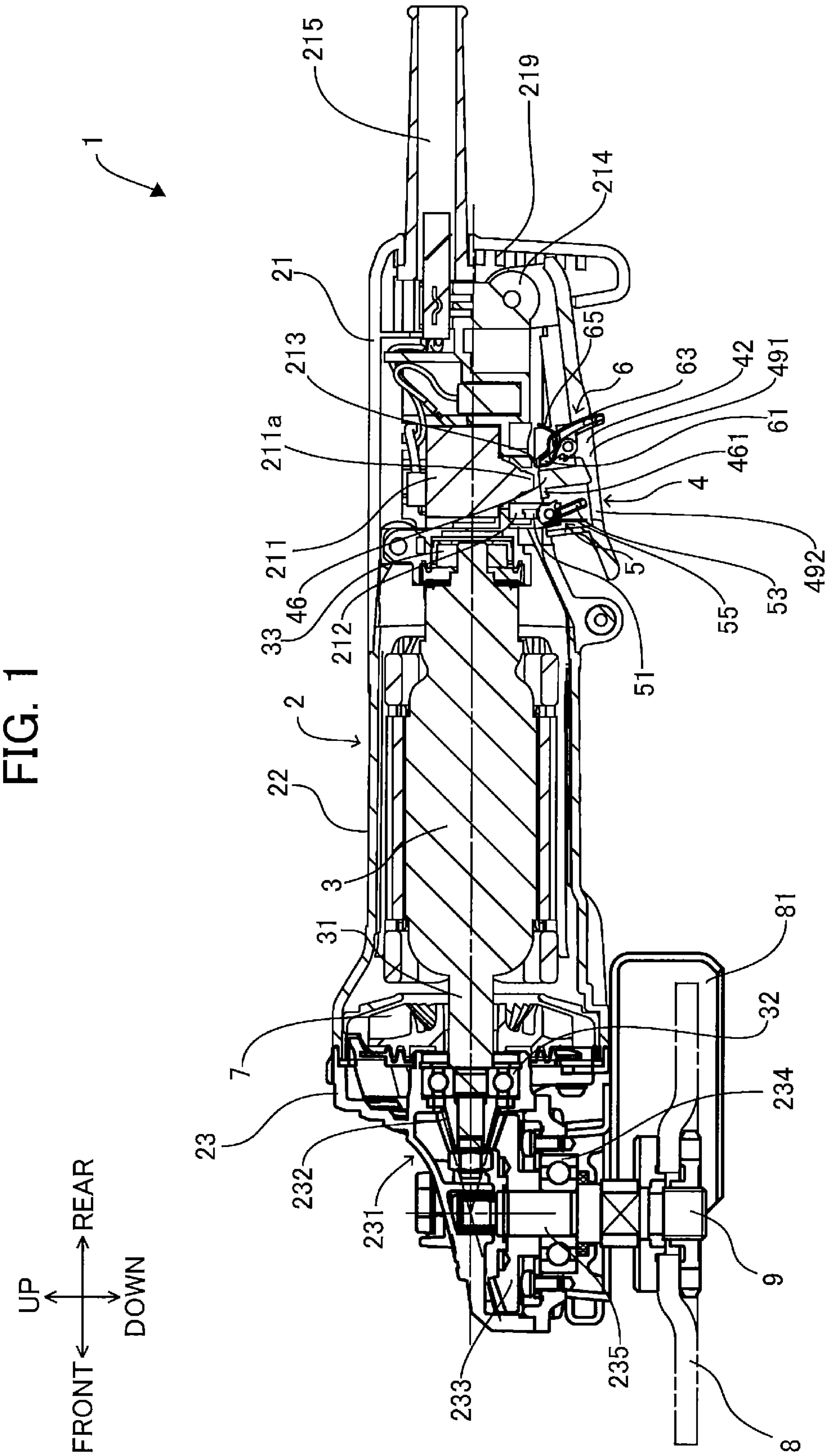
FIG. 1 is a cross-sectional view illustrating an internal structure of a disk grinder according to a first embodiment of the present invention.

Below, a disc grinder 1 will be described as an example of the power tool according to a first embodiment of the present invention while referring to FIGS. 1 through 5. FIG. 1 is a cross-sectional view showing the internal structure of the disc grinder according to the first embodiment.

As shown in FIG. 1, the disc grinder 1 is provided with a housing 2, a motor 3, a switch lever 4, an on-lock lever 5, and an off-lock lever 6. In FIG. 1, "up" is defined as the upward direction, "down" as the downward direction, "front" as the forward direction, and "rear" as the rearward direction. In addition, "right" when viewing the disc grinder 1 from the rear will be defined as the rightward direction, and "left" as the leftward direction. The switch lever 4 is an example of an operating part of the present invention. The on-lock lever 5 is an example of an on-lock operating part of the present invention. The off-lock lever 6 is an example of an off-lock operating part of the present invention.

The housing 2 forms the outer shell of the disc grinder 1. The housing 2 has a tail cover 21, a motor housing 22, a gear cover 23, and the switch lever 4.

The tail cover 21 has a substantially cylindrical shape that extends along the front-rear direction. The tail cover 21 forms the rear end of the housing 2. The front-end portion of the tail cover 21 is connected to the rear end portion of the motor housing 22. A switch 211 is accommodated in the tail cover 21. A support part 212 extends downward from the bottom surface of the tail cover 21. An anchoring part 213 is provided on the bottom surface of the tail cover 21 to the rear of the support part 212. A support part 214 is provided in the lower rear-end portion of the tail cover 21. The switch lever 4 and on-lock lever 5 are also attached to the bottom side of the tail cover 21. Further, a power cord 215 that connects to an external power supply (not shown) extends from the rear end of the tail cover 21.

The motor housing 22 has a substantially cylindrical shape that extends along the front-rear direction. The front-end portion of the motor housing 22 is connected to the rear-end portion of the gear cover 23. The motor 3 and a cooling fan 7 are accommodated in the motor housing 22.

The gear cover 23 has a substantially cylindrical shape that extends along the front-rear direction. A power transmission part 231 is accommodated in the gear cover 23.

The switch 211 has a push button 211*a* disposed so as to protrude downward from the bottom surface of the switch 211. When the bottom surface of the push button 211*a* is pressed upward, the push button 211*a* moves upward. Once the push button 211*a* has moved a prescribed distance, the switch 211 is configured to supply power to the motor 3 via the power cord 215.

The motor 3 has a rotational shaft 31 extending along the front-rear direction. The rotational shaft 31 is disposed inside the motor housing 22 so that its axial direction is aligned with the front-rear direction. The rotational shaft 31 is rotatably supported via a bearing 32 that is fixed in the gear cover 23, and a bearing 33 that is fixed in the motor housing 22.

The cooling fan 7 is positioned to the front of the motor 3. The cooling fan 7 is fixed to the rotational shaft 31 of the motor 3 so as to be capable of rotating together and coaxially with the rotational shaft 31. The cooling fan 7 is configured such that its rotating force draws air in through slit-shaped air intake holes 219, passes the air through the motor 3, and exhausts the air through exhaust holes (not shown) formed in the gear cover 23.

The power transmission part 231 has bevel gears 232 and 233, a bearing 234, and a spindle 235. The power transmission part 231 is provided on a power transmission path from the motor 3 to a grinding wheel 8, which is the tip tool. The power transmission part 231 is configured to transmit the rotating force of the rotational shaft 31 (the motor 3) to the grinding wheel 8. The spindle 235 is an example of a mounting part of the present invention.

The spindle 235 extends downward at a right angle to the rotational shaft 31 of the motor 3. The spindle 235 is rotatably supported by the bearing 234. The bearing 234 is fixed to the gear cover 23. The grinding wheel 8, i.e., the tip tool, is mounted on the bottom end of the spindle 235.

The bevel gear 232 is fixed to the front end of the rotational shaft 31 in the motor 3. The bevel gear 232 rotates together with the rotational shaft 31. The bevel gear 233 is disposed forward of the bevel gear 232 and meshes with the bevel gear 232. The bevel gear 233 is fixed to the top of the spindle 235. The bevel gear 233 rotates together and coaxially with the spindle 235. The bevel gear 233 has a larger radius than the bevel gear 232.

The grinding wheel 8 has a disc-shape and is mounted on the spindle 235 via a nut 9 so as to be perpendicular to the extending direction of the spindle 235. The grinding wheel 8 is configured of a resinoid flexible grinding wheel, a flexible grinding wheel, a resinoid grinding wheel, a sanding disc, or the like having a diameter of 100 mm, for example. Depending on the type of abrasive grains selected for use, the grinding wheel 8 can perform flat surface grinding or curved surface grinding of metal, synthetic resin, marble, concrete, and the like. Further, a semicircular wheel guard 81 is attached so as to cover the rear half of the grinding wheel 8 and is provided to suppress scattering of ground members, damaged grains, and the like.

Next, the configuration of the switch lever 4, on-lock lever 5, and off-lock lever 6 according to the first embodiment of the present invention will be described with reference to FIGS. 1 through 5. The switch lever 4 extends along the longitudinal direction of the tail cover 21 from the rear end toward the front end of the tail cover 21. As shown in FIG. 3(*b*), the switch lever 4 has a bottom portion 42, a front wall portion 43, a left wall 44, a right wall 45, a protruding part 46, a pair of support parts 47, and mounting parts 48*a* and 48*b*. The left wall, right wall and bottom portion are an example of a shielding portion of the present invention.

The bottom portion 42 has a substantially flat plate shape and forms the bottom of the switch lever 4. The mounting parts 48*a* and 48*b* are provided on the top surface of the bottom portion 42 at the rear end thereof. The mounting parts 48*a* and 48*b* are substantially annular shaped and extend upward from the top surface of the bottom portion 42. The mounting parts 48*a* and 48*b* are arranged a prescribed distance apart in the left-right direction. Through-holes 481*a* and 481*b* are respectively formed in the mounting parts 48*a* and 48*b* and penetrate the same in the left-right direction. The mounting parts 48*a* and 48*b* are pivotably fixed to the support part 214 (shaft part) of the tail cover 21 through a rotational shaft (not shown) penetrating the through-holes 481*a* and 481*b*. With this configuration, the switch lever 4 can pivot about the support part 214 (shaft part) relative to the bottom portion of the tail cover 21 in a B1 direction (clockwise) and a B2 direction (counterclockwise) indicated in FIG. 4(*b*).

A first through-hole 491 having a substantially rectangular shape is formed in the bottom portion 42 and penetrates the bottom portion 42 vertically at a position forward of the position at which the mounting parts 48*a* and 48*b* are provided. Further, a second through-hole 492 having a substantially rectangular shape is formed in the bottom portion 42 and penetrates the bottom portion 42 vertically at a position forward of the first through-hole 491. The second through-hole is an example of a through-hole of the present invention.

The support parts 47 are configured of a right support part 47A and a left support part (not shown) positioned a prescribed distance apart in the left-right direction. Since the right support part 47A and the left support part (not shown) are configured with left-right symmetry, only the right support part 47A will be described here, while a detailed structural description of the left support part (not shown) will be omitted. The right support part 47A has a general rectangular parallelepiped shape that extends leftward from the right wall 45. The right support part 47A is positioned higher than the first through-hole 491. A receiving groove 47*a* is formed in the right support part 47A. The receiving groove 47*a* extends rightward from the left surface of the right support part 47A and opens upward.

The protruding part 46 is positioned between the 47 and second through-hole 492 on the top surface of the bottom portion 42. The protruding part 46 has a substantially cylindrical shape and extends upward from the bottom portion 42. The protruding part 46 has an anchoring portion 461 that possesses a downward-protruding pawl part, and a cylindrical portion 462. The front wall portion 43 is positioned on the top surface of the bottom portion 42 at the front end thereof and is forward of the first through-hole 491. The front wall portion 43 has a flat plate shape and extends upward. The left wall 44 and right wall 45 are positioned on the top surface of the bottom portion 42 at respective left and right edges thereof. The left wall 44 and right wall 45 are arranged to sandwich the front wall portion 43 and protruding part 46 from left and right sides. Both the left wall 44 and right wall 45 have flat plate shapes and extend upward.

Figure 2:
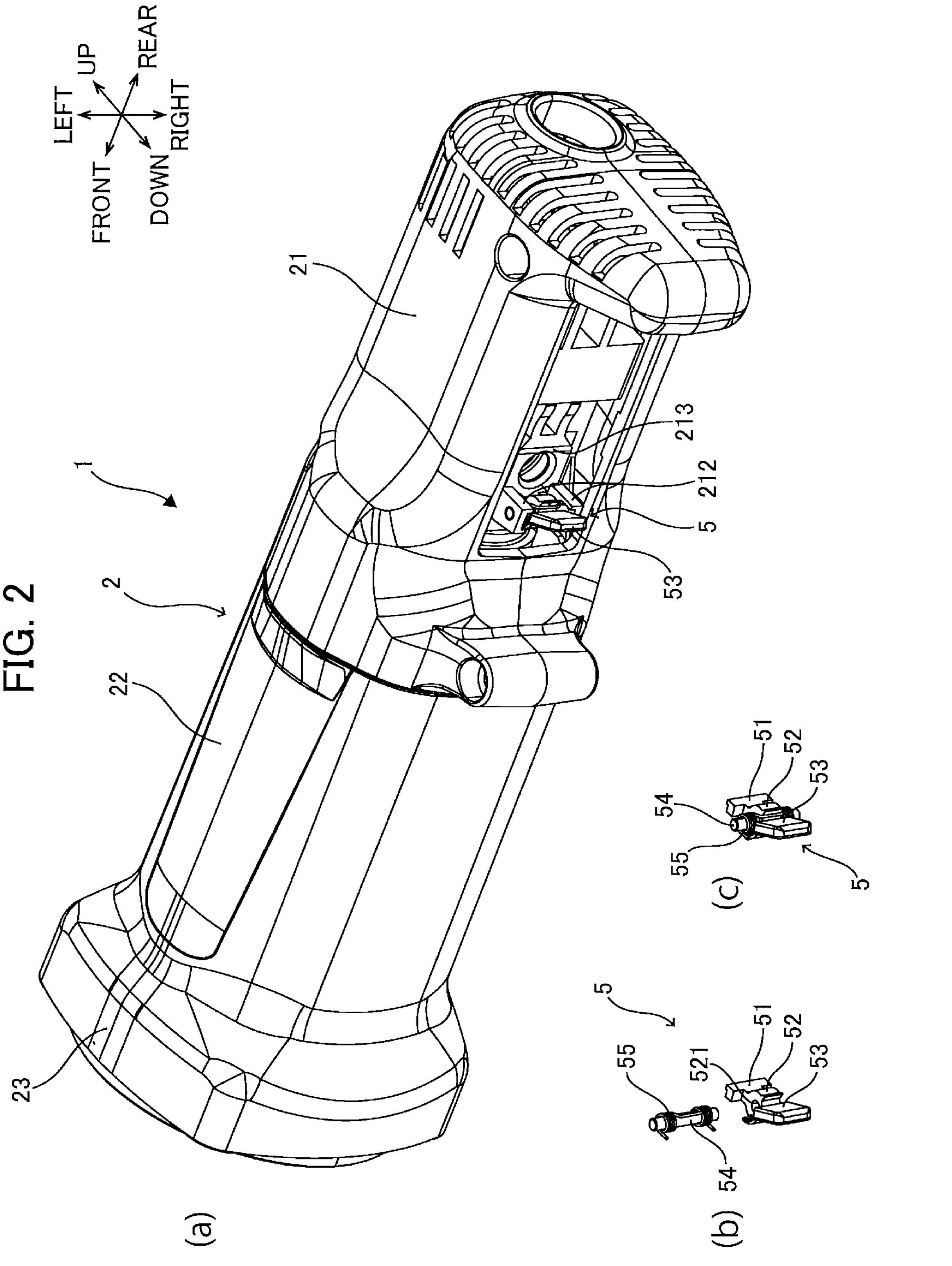
FIG. 2 is a view illustrating an external appearance of a housing and an on-lock lever of the disc grinder according to the first embodiment of the present invention, and (a) is an exploded perspective view illustrating the housing with which the on-lock lever is equipped, (b) is an exploded perspective view illustrating the on-lock lever, and (c) is a perspective view illustrating the on-lock lever.
Figure 3:
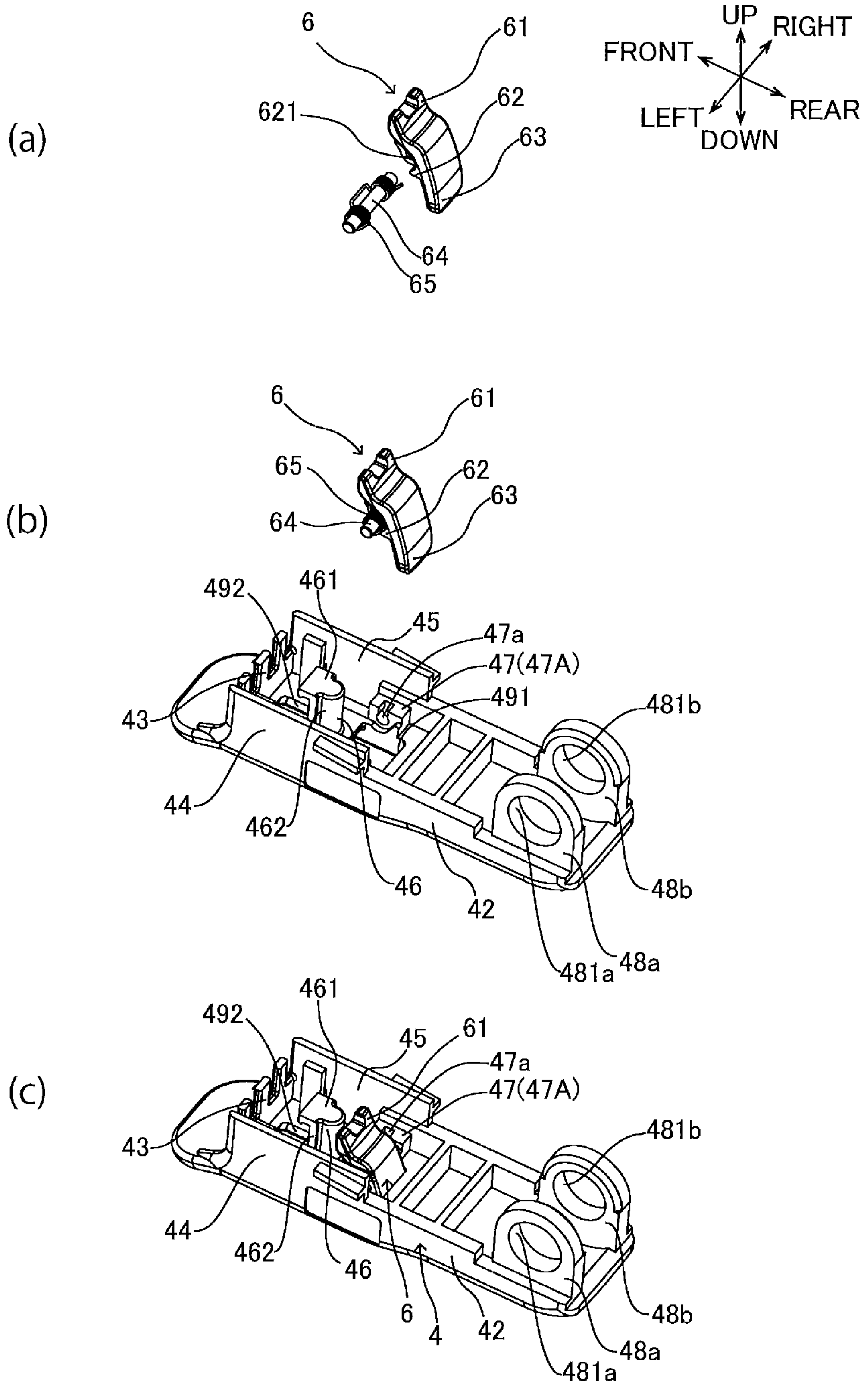
FIG. 3 is a view illustrating an external appearance of a switch lever and a off-lock lever of the disc grinder according to the first embodiment of the present invention, and (a) is an exploded perspective view illustrating the off-lock lever, (b) is a perspective view illustrating the switch lever before the off-lock lever is equipped with the switch lever, and (c) is a perspective view illustrating the switch lever with which the off-lock lever is equipped.

As shown in FIG. 2(*b*), the on-lock lever 5 has a substantially flat plate shape. The on-lock lever 5 includes an engaging part 51 on the upper end thereof, a support part 52 positioned in the center portion of the on-lock lever 5, a lever part 53 forming the opposite end of the on-lock lever 5 from the engaging part 51, a shaft 54 having a columnar shape, and a torsion spring 55. A pawl part is provided on the distal end of the engaging part 51 and is capable of engaging with the anchoring portion 461. The support part 52 has an annular shape in a side view. The shaft 54 penetrates a through-hole 521 formed in the support part 52. Both ends of the shaft 54 are fixed to the support part 212 of the tail cover 21. The lever part 53 is configured to be pivotable about the shaft 54 in a C1 direction (clockwise) and a C2 direction (counterclockwise) in FIG. 5(*a*). The torsion spring 55 is wound around the shaft 54 and urges the lever part 53 of the on-lock lever 5 in the C2 direction.

As shown in FIG. 3(*a*), the off-lock lever 6 has a substantially flat plate shape. The off-lock lever 6 includes an inner end portion 61 constituting the upper end of the off-lock lever 6, a support part 62 positioned in the center portion of the off-lock lever 6 and having an annular shape in a side view, a lever part 63 forming the opposite end of the off-lock lever 6 from the inner end portion 61, a shaft 64 having a columnar shape, and a torsion spring 65. The shaft 64 penetrates a through-hole 621 formed in the support part 62. Both ends of the shaft 64 are rotatably fixed in the receiving groove 47*a* of the right support part 47A and a corresponding receiving groove (not shown) formed in the left support part (not shown) of the switch lever 4. The lever part 63 of the off-lock lever 6 is configured to be pivotable about the rotational axis of the support part 62 in an A1 direction (clockwise) and an A2 direction (counterclockwise) in FIG. 4(*a*). The torsion spring 65 is wound about the shaft 64 and urges the lever part 63 in the B2 direction.

Next, operations of the disc grinder 1 according to the first embodiment and operations of the switch lever 4, on-lock lever 5, and off-lock lever 6 will be described with reference to FIGS. 4(*a*) through 6. To operate the disc grinder 1, the operator grips the top surface of the tail cover 21 with one hand, wrapping the fingers of the hand around the bottom portion 42 of the switch lever 4. If needed, the operator may use the other hand to grip the periphery of the motor housing 22 or a secondary handle or the like attached to the gear cover 23. The center of gravity of the disc grinder 1 is located in the area of the motor 3. Therefore, the operator grips the disc grinder 1 with hands on both sides of the center of gravity. The state of the disc grinder 1 shown in FIG. 4(*a*) is the state of the disc grinder 1 in its initial position in which no external force is being applied to the switch lever 4, on-lock lever 5, and off-lock lever 6 and none of the switch lever 4, on-lock lever 5, and off-lock lever 6 is being operated. In the initial state of the disc grinder 1, the urging force of the torsion spring 65 in the A2 direction (see FIG. 4(*a*)) forces the rear surface of the lever part 63 in the off-lock lever 6 to contact the inner circumferential surface formed in the first through-hole 491. At this time, the distal end of the lever part 63 protrudes out through the first through-hole 491. Further, the inner end portion 61 and the anchoring part 213 of the tail cover 21 are at the same position in the front-rear direction and oppose each other vertically over a prescribed interval. In this initial state, the switch lever 4 is halted by its own weight at the lowest position in the allowable pivoting range. In this initial state, the lever part 53 of the on-lock lever 5 is also halted at its rightmost position in the allowable pivoting range by the urging force of the torsion spring 55 in the C2 direction (see FIG. 5(*a*)). The position of the on-lock lever 5 at this time will be called the on-lock release position. Here, the engaging part 51 and anchoring portion 461 are disengaged.

Figure 4:
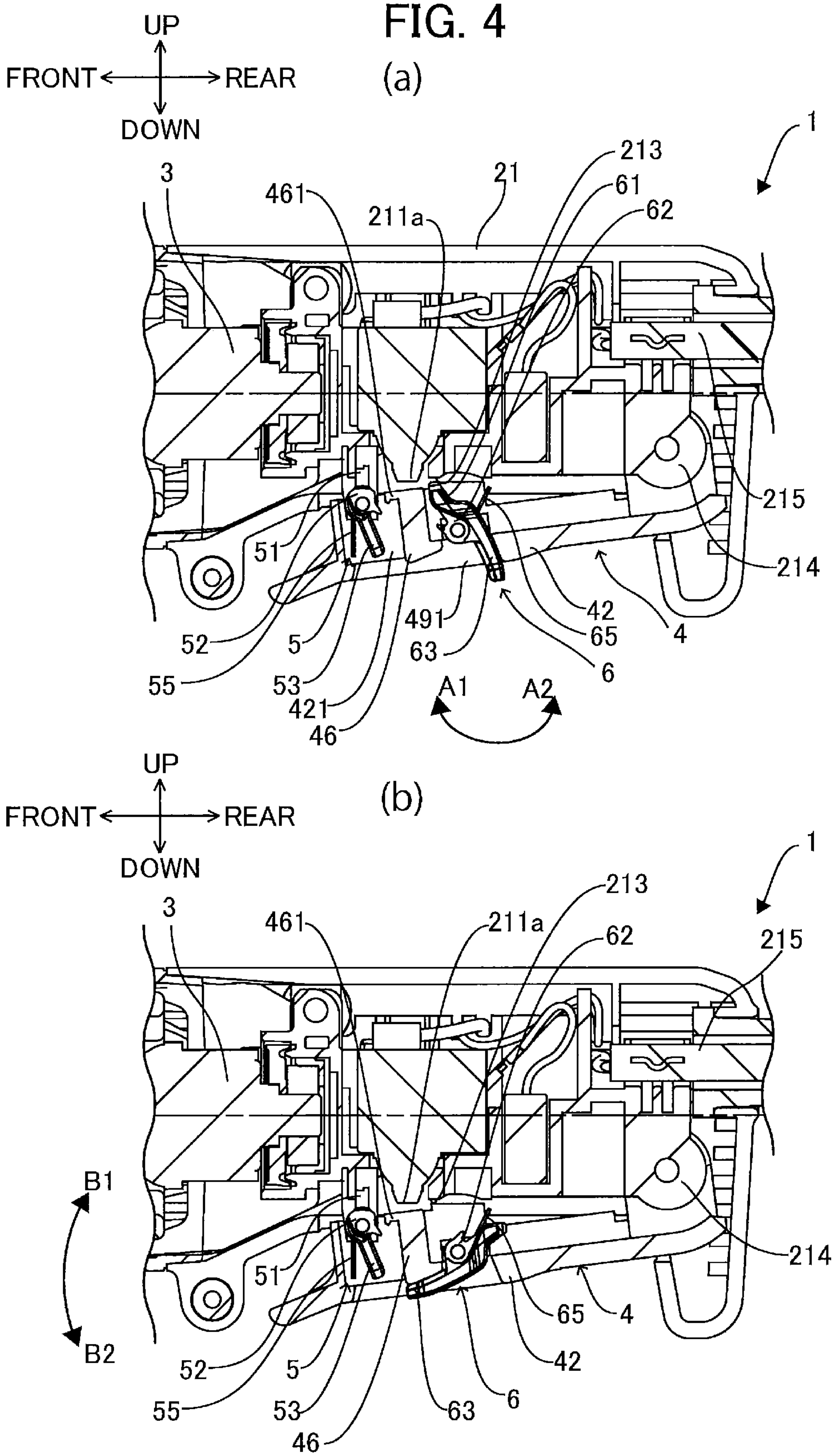
FIG. 4 is a view illustrating states where the disc grinder according to the first embodiment of the present invention is in an initial position and an off-lock release position, and (a) shows a state where the off-lock lever is in an off-lock position, and (b) shows a state where the off-lock lever is in the off-lock release position.

When the disc grinder 1 is in this initial state, even if the operator grips the bottom portion 42 of the switch lever 4 and applies force to the bottom portion 42 in the B1 direction shown in FIG. 4(*b*), the top surface of the inner end portion 61 in the off-lock lever 6 is configured to contact the bottom surface of the anchoring part 213 on the tail cover 21, preventing the switch lever 4 from pivoting more than a prescribed angle. Therefore, the protruding part 46 does not press the push button 211*a* provided for driving the motor 3. The position of the off-lock lever 6 at this time will be called the off-lock position. Further, the position of the switch lever 4 when the bottom portion 42 is in the position shown in FIG. 4(*a*) and the protruding part 46 is not pressed against the push button 211*a* will be called the OFF position. When the switch lever 4 is in the OFF position, an internal space 421 is formed. The internal space 421 is surrounded by the bottom portion 42, front wall portion 43, left wall 44, right wall 45, protruding part 46, and the outer surface on the bottom of the tail cover 21. The internal space 421 is an example of an internal space of the present invention.

When the switch lever 4 is in the OFF position as shown in FIG. 4(*a*), the entire lever part 53 of the on-lock lever 5 is accommodated in the internal space 421. Since the lever part 53 of the on-lock lever 5 is accommodated in the internal space 421 and cannot be operated at this time, the operator cannot operate the on-lock lever 5 to enable the on-lock at a stage prior to operating the switch lever 4. This configuration enhances usability of the disc grinder 1 by ensuring the operator does not unintentionally enable the on-lock for maintaining the disc grinder in an ON state when moving the switch lever 4 into the ON position for pressing the push button 211*a* to drive the motor 3.

When the operator exerts force on the lever part 63 of the off-lock lever 6 in the A1 direction of FIG. 4(*a*) to pivot the lever part 63 about the rotational axis of the support part 62 while the disc grinder 1 is in this initial state, the inner end portion 61 moves rearward, expanding the vertical gap between the anchoring part 213 and the off-lock lever 6, and enables the bottom portion 42 of the switch lever 4 to pivot in the B1 direction. While no external force is applied to the switch lever 4 and on-lock lever 5 at this time, the switch lever 4 and on-lock lever 5 remain in the initial position. The position of the off-lock lever 6 in the state shown in FIG. 4(*b*) in which the vertical gap between the anchoring part 213 and the off-lock lever 6 is sufficient to allow the bottom portion 42 to pivot in the B1 direction will be called the off-lock release position. When the off-lock lever 6 is in the off-lock release position and the on-lock lever 5 is in the on-lock release position, the bottom portion 42 of the switch lever 4 can pivot in the B1 direction.

In the state of FIG. 4(*b*), if the operator applies force to the bottom portion 42 of the switch lever 4 in the B1 direction while continuing to exert force on the lever part 63 of the off-lock lever 6 to maintain the off-lock lever 6 in the off-lock release position, the bottom portion 42 pivots in the B1 direction about the rotational axis of the support part 214. At this time, no external force is being applied to the on-lock lever 5, and the on-lock lever 5 remains in its initial position. Since the protruding part 46 moves in the same direction with the bottom portion 42, the protruding part 46 moves upward as the bottom portion 42 pivots in the B1 direction and presses against the push button 211*a* of the switch 211 to turn the switch 211 on. Accordingly, power is supplied from the external power supply to the motor 3 via the power cord 215, driving the motor 3 (FIG. 5(*a*)). The position of the switch lever 4 when the bottom portion 42 is in the position shown in FIG. 5(*a*) and the protruding part 46 is pressed against the push button 211*a* will be called the ON position.

When the motor 3 is driven, the bevel gear 232 that rotates together and coaxially with the rotational shaft 31 of the motor 3 rotates. The rotational force of the bevel gear 232 is transmitted to the bevel gear 233 meshed with the bevel gear 232 and the bevel gear 233 rotates. The spindle 235 that rotates together and coaxially with the bevel gear 233 rotates along with the rotation of the bevel gear 233, and the grinding wheel 8 mounted on the bottom end of the spindle 235 rotates. The drive force of the motor 3 is decelerated according to the ratio of radii (gear ratio) for the bevel gear 232 and bevel gear 233 and transmitted to the spindle 235.

Figure 5:
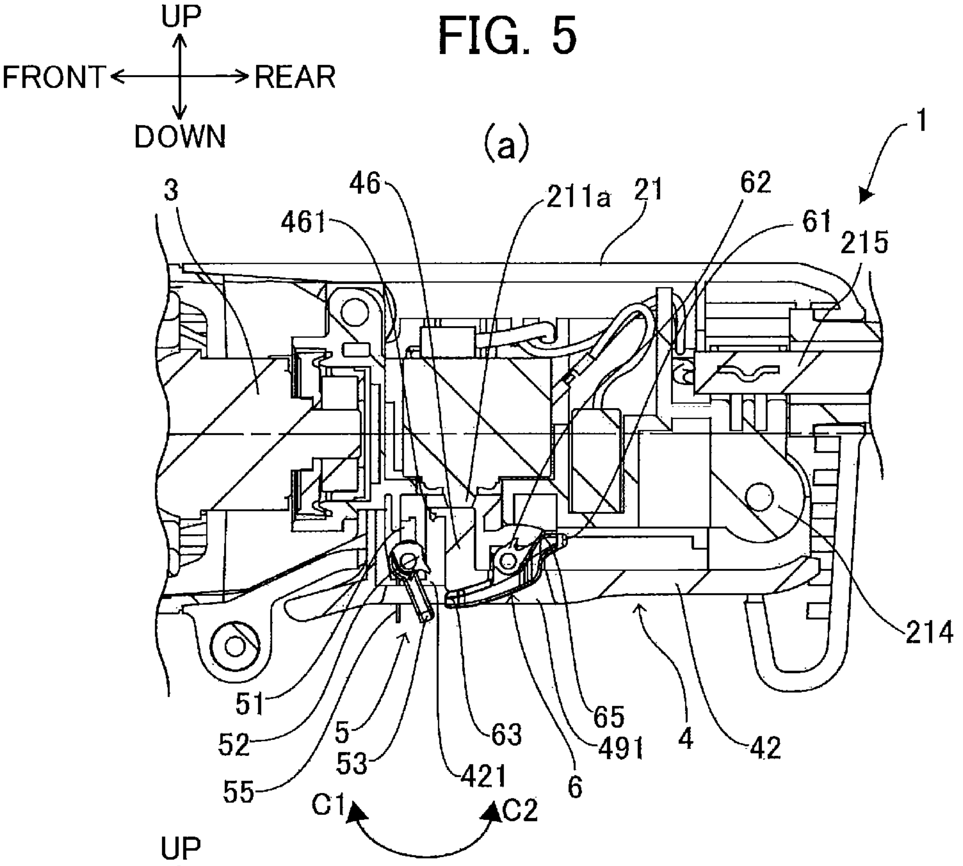
FIG. 5 is a view illustrating states where the disc grinder according to the first embodiment of the present invention is in an on position and an on-lock position, and (a) shows a state where the switch lever is in on position, (b) shows a state where the switch lever is in the on position and the state immediately before the on-lock lever is in the on-lock position.
Figure 5:
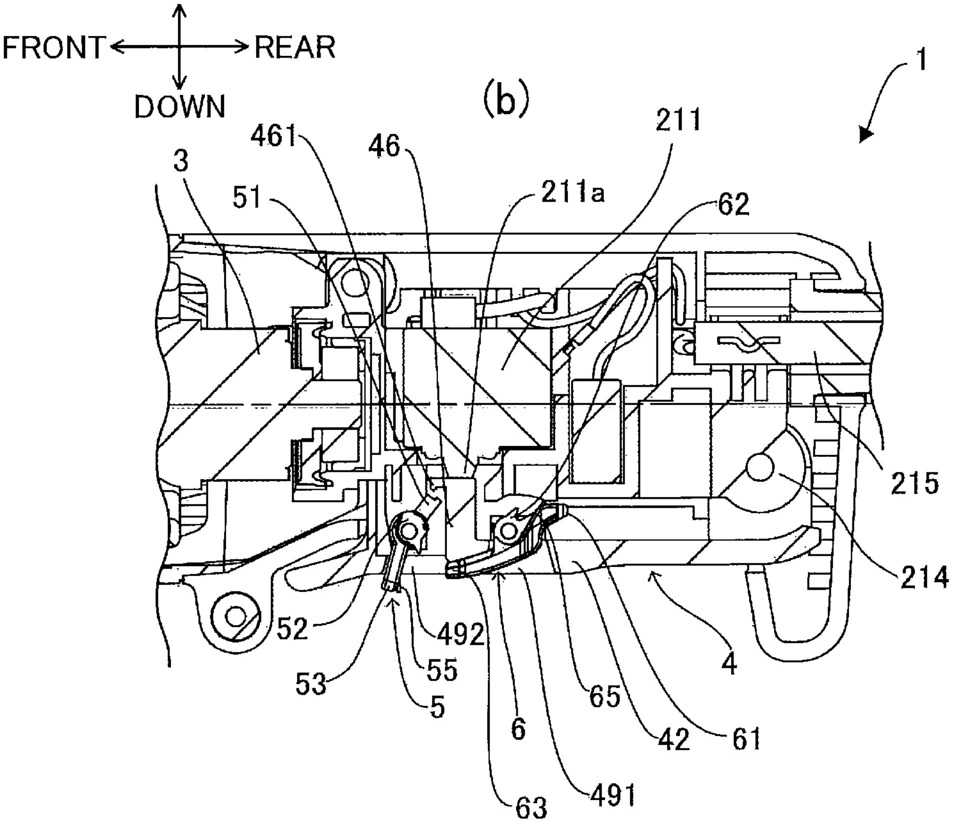

When the operator pivots the bottom portion 42 in the B1 direction, a portion of the lever part 53 on the on-lock lever 5 accommodated in the internal space 421 protrudes out through the second through-hole 492 formed in the bottom portion 42 as the switch lever 4 moves. Accordingly, the operator can operate the lever part 53, i.e., can apply external force to the lever part 53 (see FIG. 5(*a*)). The front surface of the inner end portion 61 in FIG. 4(*a*) contacts the bottom surface of the tail cover 21 at this time, as illustrated in FIG. 5(*a*). Hence, the lever part 63 will not pivot in the A2 direction even if the operator releases the lever part 63 of the off-lock lever 6.

Figure 6:
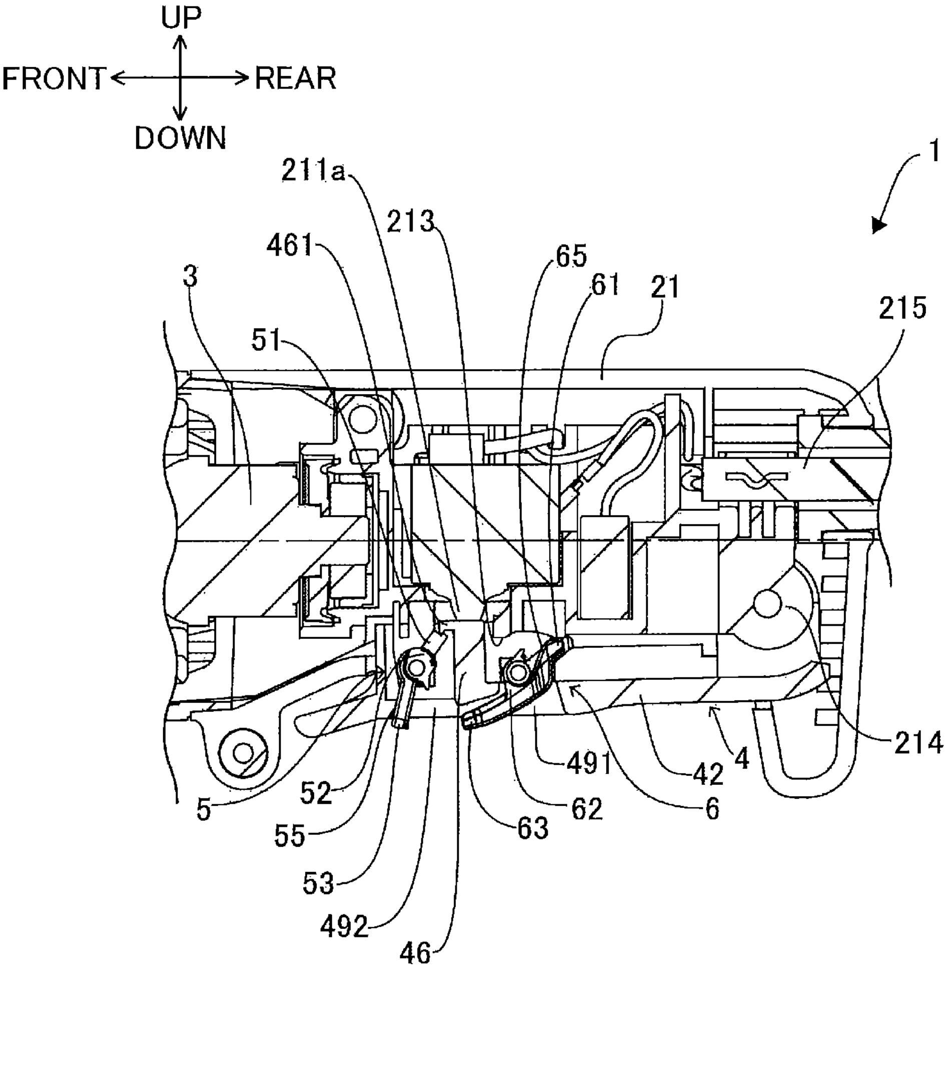
FIG. 6 is a view illustrating states where the disc grinder according to the first embodiment of the present invention is in the on position and the on-lock position, and the switch lever is in the on position and the on-lock lever is in on-lock position.

Since the anchoring portion 461 rises as the switch lever 4 rises, if the operator pivots the lever part 53 about the rotational axis of the support part 52 constituting the on-lock lever 5 to move the lever part 53 substantially forward in the C1 direction (clockwise) relative to the switch lever 4 while the switch lever 4 is maintained in the ON position shown in FIG. 5(*a*), the engaging part 51 moves substantially rearward to become positioned beneath the anchoring portion 461 (see FIG. 5(*b*)). At this time, the front surface of the inner end portion 61 on the off-lock lever 6 remains in contact with the bottom surface of the tail cover 21. While holding the lever part 53 with a finger against the urging force of the torsion spring 55, the operator gradually lightens the gripping force on the bottom portion 42 while the front-side surface of the lever part 53 contacts the inner circumferential surface formed in the second through-hole 492. Consequently, the switch lever 4 pivots in the B2 direction (counterclockwise) by the urging force of the push button 211*a*, and the pawl part of the anchoring portion 461 provided on the switch lever 4 moves downward along with the switch lever 4 until the pawl part of the engaging part 51 engages with the pawl part of the anchoring portion 461 (FIG. 6). At this time, the engaging part 51 inhibits movement of the anchoring portion 461, even after the operator releases the lever part 53 of the on-lock lever 5. Further, the front-side surface of the lever part 53 is maintained in contact with the inner circumferential surface of the second through-hole 492 through the urging force of the push button 211*a*. Since the engaged state of the engaging part 51 and anchoring portion 461 is maintained, the switch lever 4 is restricted from pivoting in the B2 direction. More specifically, the contact between the front-side surface of the lever part 53 and the inner circumferential surface of the second through-hole 492 owing to the engagement between the pawl part of the engaging part 51 on the on-lock lever 5 supported on the tail cover 21 and the pawl part of the anchoring portion 461 on the switch lever 4 halts pivoting of the switch lever 4 in the B2 direction. At this time, the switch lever 4 is maintained in the ON position, even when the operator releases the switch lever 4, and the motor 3 continues driving. The position of the on-lock lever 5 in this state will be called the on-lock position. In this state, the motor 3 is driving while operations of the switch lever 4, on-lock lever 5, and off-lock lever 6 are all halted. This state will be called the on-lock state of the disc grinder 1.

Next, the operations performed when halting operation of the disc grinder 1 will be described. When the disc grinder 1 is in the on-lock state (see FIG. 6) and the operator grips the switch lever 4 and applies force in the B1 direction, the anchoring portion 461 provided on the switch lever 4 moves upward relative to the on-lock lever 5. Hence, the pawl part of the anchoring portion 461 separates from the pawl part of the engaging part 51, disengaging the two (see FIG. 5(*b*)). Consequently, the urging force of the torsion spring 55 pivots the lever part 53 of the on-lock lever 5 in the C2 direction. The lever part 53 pivots toward the on-lock release position and stops when the rear surface of the lever part 53 contacts the inner circumference surface in the second through-hole 492 (see FIG. 5(*a*)). By releasing the engagement between the pawl part of the anchoring portion 461 and the pawl part of the engaging part 51, the switch lever 4 can pivot in the B2 direction. When the operator releases the switch lever 4, the switch lever 4 pivots farther in the B2 direction owing to the urging force of the torsion spring (not shown). Movement of the switch lever 4 is halted at the OFF position (FIG. 4(*b*)). The vertical distance between the tail cover 21 and the distal end of the switch lever 4 on the front side of the bottom portion 42 expands as the switch lever 4 pivots. Once this vertical distance reaches a prescribed value, the front surface on the inner end portion 61 of the off-lock lever 6 separates from the bottom surface on the tail cover 21. Accordingly, the lever part 63 of the off-lock lever 6 is pivoted in the A2 direction by the urging force of the torsion spring 65 and comes to a halt when the rear surface of the lever part 63 contacts the inner circumferential surface formed in the first through-hole 491. Further, the top surface of the protruding part 46 moves in a direction away from the push button 211*a* as the switch lever 4 pivots in the B2 direction. When this distance of separation reaches a prescribed magnitude, power supplied from the external power supply to the motor 3 via the power cord 215 is stopped, and the motor 3 stops driving. At this time, the drive of the motor 3 and operations of the switch lever 4, on-lock lever 5, and off-lock lever 6 are all halted, and the disc grinder 1 is back in its initial state (see FIG. 4(*a*)).

In order to maintain a stable grip on the disc grinder 1, the operator must hold the front of the disc grinder 1 with one hand and the rear with the other while performing a sequence of operations including, in order, operating the off-lock lever 6 to release the off-lock, moving the switch lever 4 to the ON position, and operating the on-lock lever 5 to enable the on-lock. At this time, since the position of the on-lock lever 5 in the front-rear direction overlaps the position of the switch lever 4, the operator can easily operate the on-lock lever 5 with the same hand used to operate the switch lever 4 and need not change grips. Hence, stable work can be performed. Further, since the on-lock lever 5 is disposed at a position farther forward than the off-lock lever 6, movement of the hand that operates the on-lock lever 5 after operating the off-lock lever 6 is limited to the forward direction so that the gripping position need not become distanced from heavy components (the motor 3 and gear cover 23). Further, while one hand operates the off-lock lever 6, the other hand gripping the front can easily be used to operate the on-lock lever 5, thereby improving usability as a whole.

The disc grinder 1 is further configured so that at least part of the lever part 53 on the on-lock lever 5 is accommodated in the housing 2 (the tail cover 21 and switch lever 4) when the switch lever 4 is in the OFF position (the initial position), and the same portion of the lever part 53 is exposed outside the housing 2 (the switch lever 4) when the switch lever 4 is in the ON position. Hence, applying force to the on-lock lever 5 is more difficult when the switch lever 4 is in the OFF position than when the switch lever 4 is in the ON position, reducing the likelihood that the operator will enable the on-lock unintentionally while the switch lever 4 is in the ON position and cause the switch lever 4 to be maintained in the ON position, thereby enhancing usability. Further, since the on-lock lever 5 is protected by the switch lever 4 in a non-working state, there is little chance that the on-lock lever 5 will suffer impacts when the disc grinder 1 is dropped, for example, thereby suppressing damage to the on-lock lever 5, which is a relatively small part.

The disc grinder 1 is also configured such that the moving direction of the lever part 63 when the off-lock lever 6 moves from the off-lock position toward the off-lock release position is opposite the moving direction of the lever part 53 when the on-lock lever 5 moves from the on-lock position toward the on-lock release position. This configuration avoids the user confusing operations of the off-lock lever 6 with operations of the on-lock lever 5, thereby further enhancing usability.

The disc grinder serving as an example of the power tool according to the first embodiment of the present invention is not limited to the embodiment described above and may be modified and improved in various ways without departing from the spirit of the invention, the scope of which is defined by the attached claims. For example, in the first embodiment described above the entire lever part 53 of the on-lock lever 5 is accommodated in the internal space 421 when the switch lever 4 is in the OFF position, and the lever part 53 protrudes outside of the second through-hole 492 when the switch lever 4 is in the ON position. However, in place of the above configuration, at least a portion of the lever part 53 on the on-lock lever 5 may be accommodated in the internal space 421 when the switch lever 4 is in the ON position, and the volume of the lever part 53 positioned inside the internal space 421 may vary according to the position of the switch lever 4. That is, the amount that the lever part 53 protrudes from the internal space 421 when the switch lever 4 is in the ON position should be greater than the amount that the lever part 53 protrudes from the internal space 421 when the switch lever 4 is in the OFF position. This configuration still makes it more difficult to operate the lever part 53 when the switch lever 4 is in the OFF position, i.e., prior to performing an operation to turn on the motor 3, than to operate the lever part 53 when the switch lever 4 is in the ON position. Accordingly, this configuration prevents the disc grinder 1 from entering the on-lock state when the switch lever 4 is placed in the ON position and suppresses the operator from unintentionally enabling the on-lock for maintaining the switch lever 4 in the ON position. Thus, this configuration can enhance usability. Further, while the mechanical structure of the on-lock lever 5 serves as the on-locking means for maintaining the motor 3 in a driving state, the on-lock lever 5 may be replaced with an electronic push switch. In this case, the on-locking means is positioned inside the housing 2 and, hence, it is still difficult to apply external force to the on-locking means prior to performing an operation to turn on the motor 3, thereby suppressing the operator from unintentionally operating the on-locking means.

Next, a disc grinder 100 will be described as an example of the power tool according to a second embodiment of the present invention while referring to FIGS. 7 through 9. The disc grinder 100 has essentially the same structure as the disc grinder 1 according to the first embodiment. Components identical to those in the disc grinder 1 are designated with the same reference numerals to avoid duplicating description. The following description will primarily cover different structures and structures that need to be described in greater detail. Structures identical to those of the disc grinder 1 obtain the same effects as described above.

Figure 7:
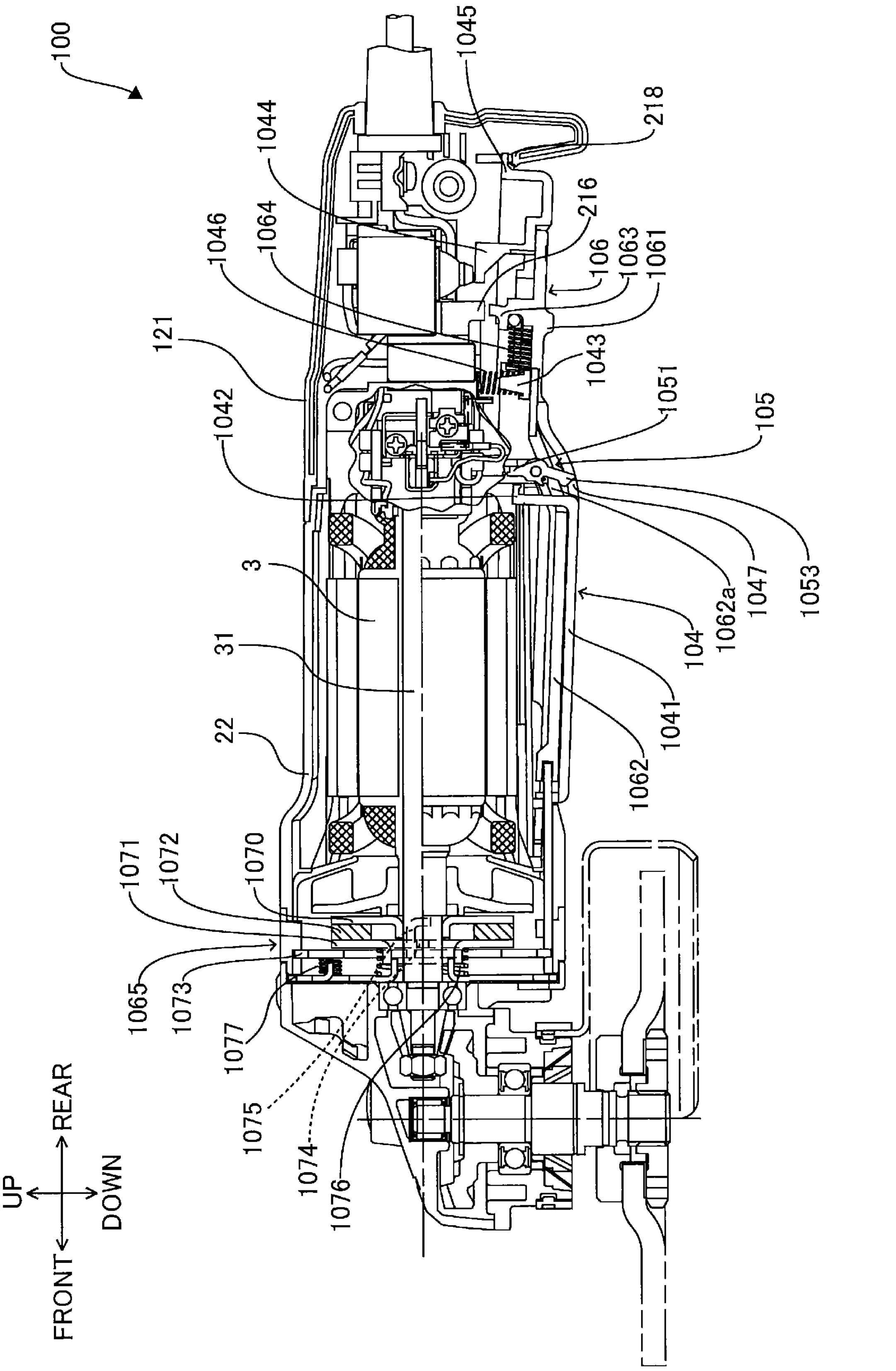
FIG. 7 is a cross-sectional view illustrating an internal structure of a disk grinder according to a second embodiment of the present invention.

As shown in FIG. 7, the disc grinder 100 according to the second embodiment is provided with a tail cover 121 in place of the tail cover 21. An anchoring part 216 is provided inside the tail cover 121 and extends downward to a position lower than the switch 211. A second anchoring part 218 is provided in the rear end of the tail cover 121 and extends upward from the bottom of the tail cover 121. In the disc grinder 100 according to the second embodiment, a switch lever part 104 is provided in place of the switch lever 4. The switch lever part 104 extends along the front-rear direction parallel to the motor housing 22 and the tail cover 121. The disc grinder 100 according to the second embodiment is also provided with an on-lock lever 105 (FIG. 7) in place of the on-lock lever 5. The on-lock lever 105 has an engaging part 1051. A torsion spring 1055 of the on-lock lever 105 urges a lever part 1053 in the clockwise direction of FIG. 7. When moving the on-lock lever 105 to the on-lock position, the operator pivots the lever part 1053 counterclockwise against the urging force of the torsion spring 1055. The disc grinder 100 according to the second embodiment is also provided with an off-lock part 106 in place of the off-lock lever 6. The off-lock part 106 extends along the front-rear direction parallel to the motor housing 22 and the tail cover 121.

The switch lever part 104 has a flat part 1041, an engaging part 1042, a first protruding part 1043, a second protruding part 1044, a rear portion 1045, and a spring 1046. The flat part 1041 has a flat plate shape and extends along the front-rear direction. The front end of the flat part 1041 is supported on the bottom of the motor housing. When an upward external force is applied to the bottom surface of the flat part 1041, the switch lever part 104 can pivot about the front end of the flat part 1041. The engaging part 1042 has an inverted L-shape in a side view and extends upward from the rear end of the flat part 1041. A pawl part is provided on the distal end of the engaging part 1042. The first protruding part 1043 is substantially triangular shaped in a side view. The first protruding part 1043 is positioned to the rear of the engaging part 1042 and extends upward from the top surface of the switch lever part 104. The second protruding part 1044 is substantially triangular shaped in a side view. The second protruding part 1044 extends upward from the top surface of the switch lever part 104. The top surface of the second protruding part 1044 confronts the bottom surface of the push button 211*a*. The rear portion 1045 forms the rear end of the switch lever part 104 and has an inverted L-shape in a side view. The rear portion 1045 has a pawl part that extends rearward. The bottom surface of the pawl part is positioned above the top surface of the second anchoring part 218. The spring 1046 is wound around the first protruding part and extends upward from the top surface of the switch lever part 104. The top end of the spring 1046 is fixed to a portion of the tail cover 121. The spring 1046 urges the switch lever part 104 downward. A through-hole 1047 is formed in the switch lever part 104. The through-hole 1047 penetrates the switch lever part 104 vertically at a position between the engaging part 1042 and first protruding part 1043 in the front-rear direction.

The off-lock part 106 has a lever part 1061, a coupling part 1062, a third protruding part 1063, a spring 1064, and a braking part 1065. The lever part 1061 is supported from below by the switch lever part 104 so as to be capable of sliding in the front-rear direction relative to the switch lever part 104. The coupling part 1062 is configured of a plurality of flat plate-shaped members coupled together and extends along the front-rear direction. The bottom surface on the front-end portion of the coupling part 1062 contacts the inside surface on the bottom wall of the motor housing 22. The bottom surface on the center portion of the coupling part 1062 contacts the top surface on the front portion of the switch lever part 104. The rear-end portion of the coupling part 1062 is connected to the front-end portion of the lever part 1061. A through-hole 1062*a* is formed in the coupling part 1062 and penetrates the coupling part 1062 vertically at the same position in the front-rear direction as the through-hole 1047. The on-lock lever 105 is disposed in the through-hole 1062*a*. The third protruding part 1063 is substantially rectangular shaped in a side view. The third protruding part 1063 is positioned in the center of the lever part 1061 relative to the front-rear direction and extends upward from the top surface of the lever part 1061. A protrusion is provided on the upper end of the third protruding part 1063 and protrudes upward therefrom. The spring 1064 extends in the front-rear direction and is disposed between the first protruding part 1043 and the third protruding part 1063 in the front-rear direction. The spring 1064 urges the third protruding part 1063 rearward.

The braking part 1065 has a contact part 1070, a pressing part 1071, a pair of brake pads 1072, an intermediate part 1073, a protruding part 1074, a hooking part 1075, a spring 1076, and a spring 1077. The contact part 1070 has an annular shape with a through-hole formed in the center portion. The contact part 1070 is positioned forward of the cooling fan 7. The rotational shaft 31 of the motor 3 is fixed in the through-hole formed in the contact part 1070. With this arrangement, the rotational shaft 31 and the pressing part 1071 can rotate together about an axis extending in the front-rear direction. The pressing part 1071 has an annular shape with a through-hole formed in the center portion. The pressing part 1071 is positioned forward of the contact part 1070. The rotational shaft 31 is inserted through the through-hole of the pressing part 1071. The pressing part 1071 is supported in the motor housing 22 so as to be capable of moving in the front-rear direction. The through-hole formed in the center portion of the pressing part 1071 has a larger diameter than the outer diameter of the rotational shaft 31. The brake pads 1072 are provided on the rear surface of the pressing part 1071 so as to be symmetrical about the axial center of the rotational shaft 31. The intermediate part 1073 has an annular shape with a through-hole formed in the center portion thereof. The rotational shaft 31 is inserted through the through-hole. The through-hole formed in the center portion of the intermediate part 1073 has a larger diameter than the outer diameter of the rotational shaft 31. While no external force is acting on the disc grinder 100, the rear surface of the intermediate part 1073 is in contact with the front surface of the pressing part 1071, the rear surface on the top end of the intermediate part 1073 is in contact with the inner circumferential surface of the motor housing 22, and the bottom end of the intermediate part 1073 is connected to the coupling part 1062. The intermediate part 1073 is supported in the motor housing 22 so as to be capable of pivoting about a rotational axis (not shown) near the surface of the intermediate part 1073 that contacts the inner circumferential surface of the motor housing 22. The protruding part 1074 is substantially rectangular shaped in a side view. The protruding part 1074 protrudes rearward from the left side of the inner circumferential surface forming the through-hole in the pressing part 1071. The hooking part 1075 has an L-shape in a side view. The hooking part 1075 protrudes rearward from the rear surface of the intermediate part 1073 at a position above the protruding part 1074. A pawl part is provided on the rear end of the hooking part 1075 and extends downward therefrom. The spring 1076 is disposed between the front surface of the pressing part 1071 and the inner surface of the motor housing 22 in the front-rear direction. The rotational shaft 31 is inserted through the spring 1076. The spring 1076 extends in the front-rear direction and urges the pressing part 1071 rearward. The spring 1077 extends in the front-rear direction at a position above the rotational shaft 31. The spring 1077 is a tension spring disposed between the front surface of the intermediate part 1073 and the inside surface of the motor housing 22 in the front-rear direction. The spring 1077 urges the intermediate part 1073 rearward. Through the urging force of the spring 1077, the coupling part 1062 is urged rearward via the intermediate part 1073.

Next, operations of the disc grinder 100 according to the second embodiment and operations of the switch lever 104, on-lock lever 105, and off-lock lever 106 will be described with reference to FIGS. 8(*a*) through 9(*b*).

To operate the disc grinder 100, the operator supports the switch lever part 104 around the flat part 1041 or the gear cover with one hand and grips the off-lock part 106 around the lever part 1061 with the other hand. The state of the disc grinder 100 shown in FIG. 8(*a*) is the state in which no external force is being applied to the switch lever part 104, on-lock lever 105, and off-lock part 106, and none of the switch lever part 104, on-lock lever 105, and off-lock part 106 is being operated. In this state, the lever part 1061 of the off-lock part 106 is halted in the rearmost position of its slidable range by the urging force of the spring 1064. At this time, the top surface of the protrusion on the third protruding part 1063 vertically opposes the bottom surface of the anchoring part 216 on the tail cover 121 at a prescribed distance. In this initial state, the switch lever part 104 is also urged substantially downward relative to the tail cover 121 in the B2 direction (FIG. 8(*b*)) by the spring 1046 and is halted in the lowermost position within the pivotable range of the switch lever part 104. The lever part 1053 of the on-lock lever 105 is also halted in the leftmost position of its pivotable range by the urging force of the torsion spring 1055 in the C1 direction (FIG. 9(*a*)). The position of the on-lock lever 105 at this time will be called the on-lock release position. The engaging part 1051 and the engaging part 1042 are not engaged at this time. Further, in the initial state, the rear surfaces of the brake pads 1072 are in contact with the front surface of the contact part 1070 provided on the rotational shaft 31. Since the urging force of the spring 1076 presses the front surface of the contact part 1070 against the rear surfaces of the brake pads 1072 through the pressing part 1071, frictional force between the rear surfaces of the brake pads 1072 and the front surface of the contact part 1070 restrains rotation of the rotational shaft 31, even if the push button 211*a* were accidentally pressed to drive the motor 3. The state of the braking part 1065 at this time will be called the brake enabled state.

Figure 8:
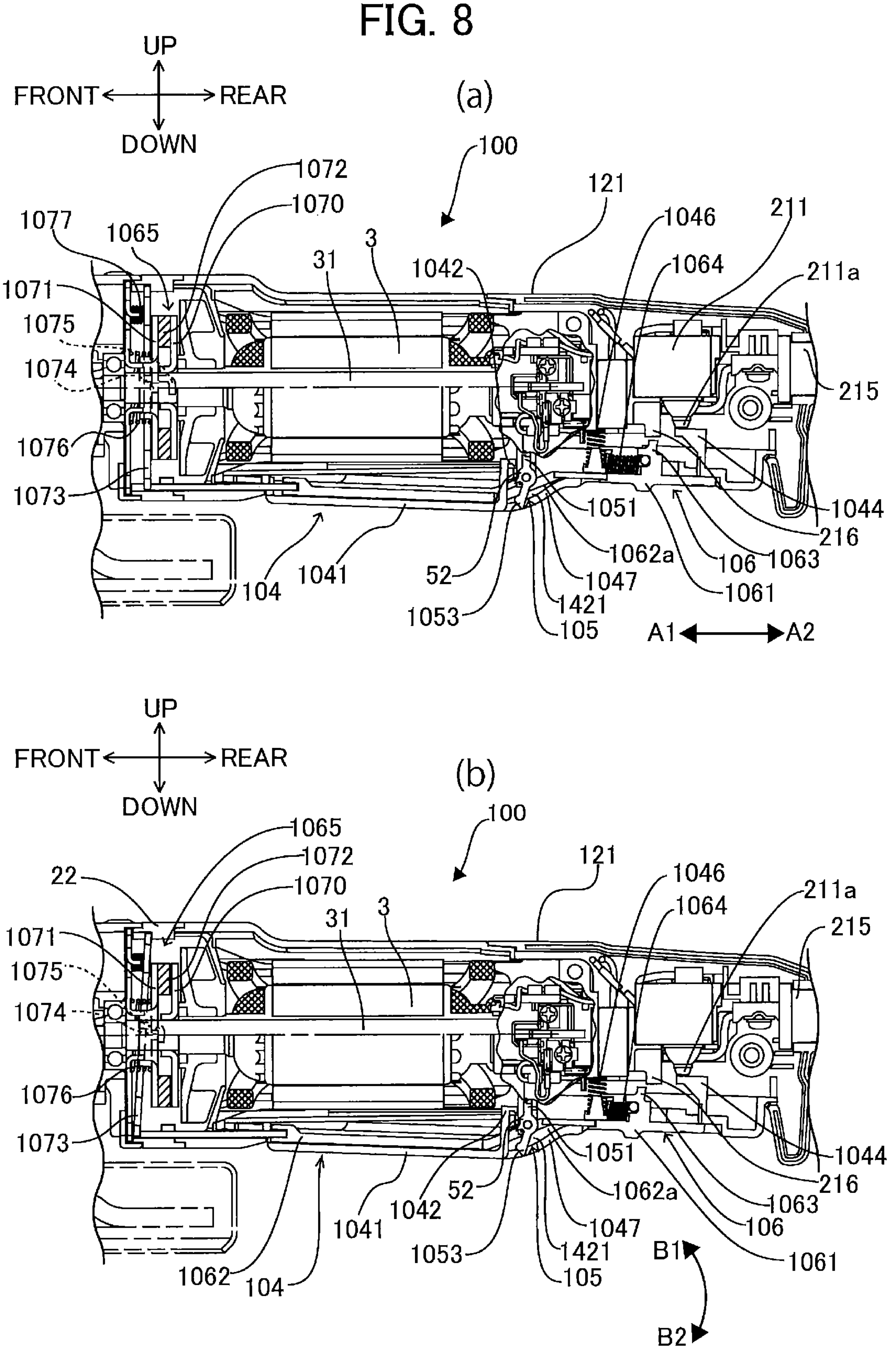
FIG. 8 is a view illustrating states where the disc grinder according to the second embodiment of the present invention is in an initial position and an off-lock releasing position, and (a) shows a state where an off-lock part is in an off-lock position, (b) shows a state where the off-lock part is in the off-lock releasing position.

Even if the operator were to apply an external force to the switch lever part 104 in the B1 direction shown in FIG. 8(*b*) while none of the switch lever part 104, on-lock lever 105, and off-lock part 106 is being operated, the top surface of the protrusion on the third protruding part 1063 is configured to contact the bottom surface of the anchoring part 216, preventing the flat part 1041 from pivoting more than a prescribed angle. Accordingly, the second protruding part 1044 does not press against the push button 211*a* that serves to drive the motor 3. The position of the off-lock part 106 at this time will be called the off-lock position. Further, the position of the switch lever part 104 when the flat part 1041 is in the position shown in FIG. 8(*a*) and the second protruding part 1044 is not pressed against the push button 211*a* will be called the OFF position. When the switch lever part 104 is in the OFF position, an internal space 1421 is formed (FIG. 8(*a*)). The internal space 1421 is surrounded by the inner circumferential surface forming the through-hole 1062*a*, and the inner circumferential surface forming the through-hole 1047.

When the switch lever part 104 is in the OFF position as shown in FIG. 8(*a*), the entire lever part 1053 of the on-lock lever 105 is accommodated in the internal space 1421. At this time, an external force cannot easily be applied to the lever part 1053 of the on-lock lever 105 since the lever part 1053 is accommodated in the internal space 1421. Accordingly, the operator cannot apply force to the on-lock lever 105 at a stage prior to operating the switch lever part 104, thereby suppressing the operator from enabling the on-lock unintentionally.

When the operator applies force to the lever part 1061 of the off-lock part 106 in the A1 direction shown in FIG. 8(*a*) to slide the lever part 1061 forward, the third protruding part 1063 provided on the lever part 1061 slides forward relative to the anchoring part 216. As a result, the top end of the third protruding part 1063 no longer confronts the anchoring part 216 vertically (FIG. 8(*b*)), and the flat part 1041 can now pivot in the B1 direction. The coupling part 1062 also slides in the A1 direction along with the lever part 1061, and the front end of the coupling part 1062 pushes the bottom end of the intermediate part 1073 forward. Consequently, the intermediate part 1073 pivots clockwise in FIG. 8(*b*) about the upper end of the intermediate part 1073. Since the hooking part 1075 provided on the intermediate part 1073 pivots clockwise as a result, the pawl part forming the rear end of the hooking part 1075 contacts the protruding part 1074 provided on the pressing part 1071 (FIG. 8(*b*)). The hooking part 1075 pivots further clockwise, and the pressing part 1071 moves substantially forward relative to the motor housing together with the protruding part 1074 against the urging force of the spring 1076. Accordingly, the rear surfaces of the brake pads 1072 provided on the pressing part 1071 separate from the front surface of the contact part 1070. The state of the braking part 1065 at this time will be called a brake release state. At this time, the switch lever part 104 and on-lock lever 105 remain in their initial positions while no force is applied to the switch lever part 104 and on-lock lever 105. When the off-lock part 106 is at the position shown in FIG. 8(*b*), the top end of the third protruding part 1063 no longer opposes the anchoring part 216 vertically, and a sufficient vertical gap exists below the bottom surface of the tail cover 121. The position of the off-lock part 106 when the flat part 1041 is allowed to pivot in the B1 direction will be called the off-lock release position. When the off-lock part 106 of the disc grinder 100 is in the off-lock release position and the on-lock lever 105 is in the on-lock release position, the switch lever part 104 can pivot in the B1 direction.

In the state of FIG. 8(*b*), when the operator grips the flat part 1041 of the switch lever part 104 and applies force to the flat part 1041 in the B1 direction while continuing to exert force on the lever part 1061 of the off-lock part 106 against the urging force of the spring 1064 in order to maintain the off-lock part 106 in the off-lock release position, the flat part 1041 pivots in the B1 direction about a rotational axis (not shown) positioned at the front end of the flat part 1041. At this time, no external force is being applied to the on-lock lever 105, and the on-lock lever 105 remains in the initial position. Further, the braking part 1065 is in the brake release state. The second protruding part 1044 provided on the switch lever part 104 moves upward as the flat part 1041 pivots in the B1 direction and presses against the push button 211*a* of the switch 211. Accordingly, power is supplied from the external power supply (not shown) to the motor 3 via the power cord 215, driving the motor 3 (FIG. 9(*a*)). The position of the switch lever part 104 when the flat part 1041 is in the position shown in FIG. 9(*a*) and the second protruding part 1044 is pressed against the push button 211*a* will be called the ON position.

When the operator pivots the flat part 1041 in the B1 direction, a portion of the lever part 1053 constituting the on-lock lever 105 accommodated in the internal space 1421 protrudes out through the through-hole 1047 formed in the switch lever part 104 as the switch lever part 104 moves. Accordingly, the operator can now operate the lever part 1053 (FIG. 9(*a*)). As shown in FIG. 9(*a*), the top surface of the protrusion on the third protruding part 1063 is positioned higher than the bottom surface of the anchoring part 216 at this time, and the protrusion on the third protruding part 1063 is positioned forward of the anchoring part 216 by a prescribed distance.

Figure 9:
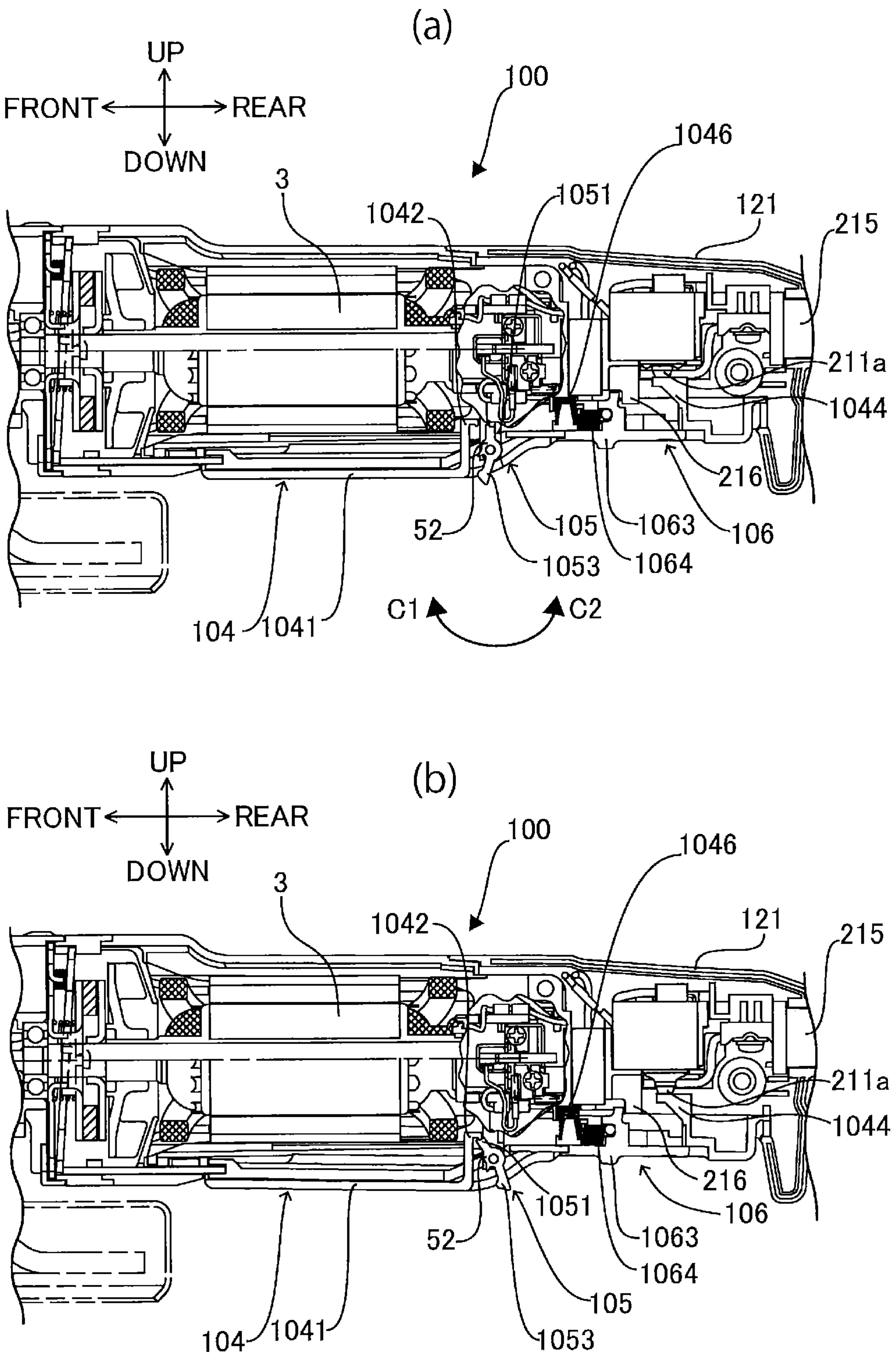
FIG. 9 is a view illustrating states where the disc grinder according to the second embodiment of the present invention is in an on position and an on-lock position, and (a) shows a state where a switch lever part is in the on position, and (b) shows a state where the switch lever part is in the on position and the on-lock lever is in the on-lock position.

When the operator pivots the lever part 1053 about the rotational axis of the support part 52 for the on-lock lever 105 in the C2 direction (counterclockwise) in FIG. 9(*a*) while the switch lever part 104 is maintained in the ON position shown in FIG. 9(*a*), the engaging part 1051 moves substantially forward to become positioned beneath the pawl part of the engaging part 1042 (FIG. 9(*a*)). At this time, the top surface of the protrusion on the third protruding part 1063 is positioned higher than the bottom surface of the anchoring part 216, and the rear surface of the protrusion on the third protruding part 1063 remains a prescribed distance forward of the front surface on the anchoring part 216. If the operator gradually lightens the force of grip on the flat part 1041 while holding the lever part 1053 with a finger against the urging force of the torsion spring 1055 to maintain the lever part 1053 in the rightmost position within its pivotable range, the switch lever part 104 is pivoted in the B2 direction (clockwise) about the front end of the flat part 1041 by the urging force of the spring 1046. Accordingly, the pawl part of the engaging part 1042 provided on the switch lever part 104 moves downward and engages with the pawl part on the engaging part 1051 (FIG. 9(*b*)). At this time, the urging force of the spring 1046 that urges the switch lever part 104 in the B2 direction to lower the engaging part 1042 provided on the switch lever part 104 side is greater than the urging force of the torsion spring 1055 that urges the engaging part 1051 in the C1 direction. Consequently, even if the operator releases the lever part 1053 of the on-lock lever 105, the engagement between the engaging part 1051 and engaging part 1042 is maintained, i.e., the pawl part on the engaging part 1051 and pawl part on the engaging part 1042 do not disengage unless a prescribed force is applied. The switch lever part 104 is stopped from pivoting in the B2 direction by this engagement between the pawl part on the engaging part 1051 of the on-lock lever 105 supported on the tail cover 121 and the pawl part of the engaging part 1042 on the switch lever part 104. When the operator releases the lever part 1061, the rear surface of the protrusion on the third protruding part 1063 contacts the front surface of the anchoring part 216 and stops the lever part 1061 from sliding rearward at this time (FIG. 9(*b*)). Further, the switch lever part 104 is maintained in the ON position when the operator releases the flat part 1041, and the motor 3 continues driving. The position of the on-lock lever 105 in this state will be called the on-lock position. At this time, the motor 3 is driving while operations of the switch lever part 104, on-lock lever 105, and off-lock part 106 are all halted. The braking part 1065 is in the brake release state. This state will be called the on-lock state of the disc grinder 100.

Next, the operations performed when halting operation of the disc grinder 100 will be described. When the disc grinder 100 is in the on-lock state (see FIG. 9(*b*)) and the operator grips the switch lever part 104 and applies force in the B1 direction, the engaging part 1042 provided on the switch lever part 104 moves upward relative to the on-lock lever 105. Hence, the pawl part of the engaging part 1042 separates from the pawl part of the engaging part 1051, disengaging the two. Consequently, the urging force of the torsion spring 1055 pivots the lever part 1053 of the on-lock lever 105 in the C1 direction. The lever part 1053 pivots toward the on-lock release position and stops at the leftmost position within its pivotable range (FIG. 9(*a*)). By releasing the engagement between the pawl part of the engaging part 1042 and the pawl part of the engaging part 1051, the switch lever part 104 can pivot in the B2 direction. When the operator releases the flat part 1041, the flat part 1041 pivots farther in the B2 direction owing to the urging force of the spring 1046. Movement of the switch lever part 104 is halted at the OFF position (FIG. 8(*b*)). At the same time, the lever part 1061 of the off-lock part 106 is slid in the A2 direction by the urging force of the spring 1064 and comes to a halt at the rearmost position in its slidable range. At this time, the urging force of the spring 1076 presses the brake pads 1072 provided on the pressing part 1071 against the front surface of the contact part 1070, placing the braking part 1065 in the brake enabled state. The top surface of the second protruding part 1044 also moves in a direction away from the push button 211*a* as the flat part 1041 pivots in the B2 direction. When the second protruding part 1044 has moved a prescribed distance away from the push button 211*a*, power supplied from the external power supply to the motor 3 via the power cord 215 is stopped, and the motor 3 stops driving. At this time, the drive of the motor 3 and operations of the switch lever part 104, on-lock lever 105, and off-lock part 106 are all halted (FIG. 8(*a*)). Since the on-lock lever 105 is accommodated in the housing when the switch lever part 104 is in the OFF position in the preferred embodiment, an external force cannot easily be applied to the on-lock lever 105, restraining the disc grinder 100 from being placed in the on-lock state unintentionally.

Next, a disc grinder 200 will be described as an example of the power tool according to a third embodiment of the present invention while referring to FIG. 10. The disc grinder 200 has essentially the same structure as the disc grinder 100 according to the second embodiment. Components identical to those in the disc grinder 100 are designated with the same reference numerals to avoid duplicating description. The following description will primarily cover different structures and structures that need to be described in greater detail. Structures identical to those of the disc grinder 100 obtain the same effects as described above.

Figure 10:
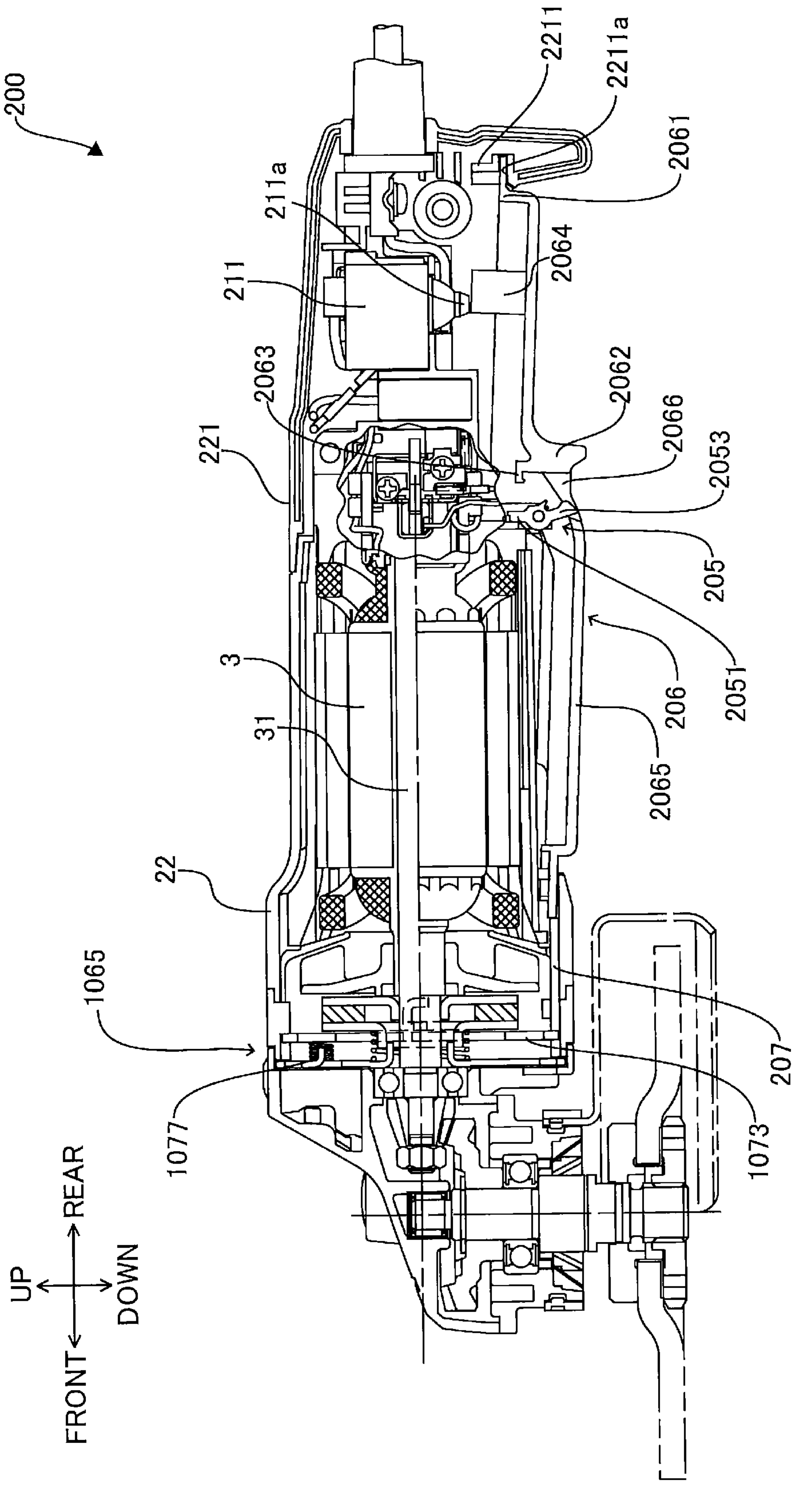
FIG. 10 is a cross-sectional view illustrating an internal structure of a disk grinder according to a third embodiment of the present invention.

As shown in FIG. 10, the disc grinder 200 according to the third embodiment is provided with a tail cover 221 in place of the tail cover 121. The tail cover 221 has a wall part 2211. A through-hole 2211*a* extending along the front-rear direction is formed in the wall part 2211. The disc grinder 200 according to the third embodiment is also provided with a sliding part 206 in place of the switch lever part 104 and off-lock part 106. The disc grinder 200 according to the third embodiment is also provided with an on-lock lever 205 in place of the on-lock lever 105. An engaging part 2051 is formed on the top end of the on-lock lever 205, and a lever part 2053 is formed on the bottom end of the on-lock lever 205. The on-lock lever 205 also has a torsion spring 2055 in place of the torsion spring 1055. The torsion spring 2055 urges the lever part 2053 counterclockwise. When moving the on-lock lever 205 to the on-lock position, the operator pivots the lever part 2053 clockwise in FIG. 10. A linkage part 207 is provided on the inner surface of the bottom wall constituting the motor housing 22 of the disc grinder 200 according to the third embodiment. The linkage part 207 has a flat plate shape and extends along the front-rear direction. The front end of the linkage part 207 is connected to the bottom end of the intermediate part 1073.

The sliding part 206 extends along the front-rear direction parallel to the motor housing 22 and the tail cover 221. The sliding part 206 is supported on the motor housing 22 and tail cover 221 so as to be capable of sliding in the front-rear direction. The bottom surface on the front end of the sliding part 206 is in contact with the inner surface on the bottom wall of the motor housing 22, and the front surface on the front end of the sliding part 206 contacts the rear end of the linkage part 207. The sliding part 206 has a rear end 2061, a grip part 2062, an engaging part 2063, a protruding part 2064, and a flat part 2065. The rear end 2061 forms the rear end of the sliding part 206 and has a pawl part that extends in the front-rear direction so as to be insertable in the through-hole 2211*a*. The grip part 2062 is positioned in the center of the sliding part 206 relative to the front-rear direction. The grip part 2062 protrudes downward from the bottom surface of the sliding part 206. The engaging part 2063 has an L-shape in a side view. The engaging part 2063 is disposed in the same position as the grip part 2062 relative to the front-rear direction and extends upward from the top surface of the sliding part 206. A pawl part capable of engaging with the engaging part 2051 is provided on the distal end of the engaging part 2063. The protruding part 2064 has a rectangular shape in a side view. The protruding part 2064 is disposed at the same position as the push button 211*a* relative to the front-rear direction. The protruding part 2064 extends upward from the top surface of the sliding part 206. The top surface of the protruding part 2064 confronts the bottom surface of the push button 211*a*. The flat part 2065 has a flat plate shape. The flat part 2065 is disposed at a position below the motor housing 22 and extends along the front-rear direction substantially parallel to the motor housing 22. The portion of the bottom wall constituting the sliding part 206 that is positioned below the on-lock lever 205 slopes upward toward the rear. A through-hole 2066 is formed in this sloped surface, penetrating the wall portion vertically. When the operator applies upward force to the bottom surface of the flat part 2065, the sliding part 206 can pivot about a rotational axis (not shown) positioned at the front end of the sliding part 206. When the sliding part 206 is slid in the front-rear direction, the sliding part 206 pushes the linkage part 207 forward. Further, the bottom end of the intermediate part 1073 connected to the front end of the linkage part 207 moves substantially forward inside the motor housing 22.

Next, operations of the disc grinder 200 according to the third embodiment and operations of the on-lock lever 205 and sliding part 206 will be described with reference to FIGS. 8(*a*) through 9(*b*).

To operate the disc grinder 200, the operator supports the sliding part 206 around the flat part 2065 or the gear cover with one hand and grips the grip part 2062 of the sliding part 206 with the other hand. The state of the disc grinder 200 shown in FIG. 11(*a*) is the state in which no external force is being applied to the sliding part 206 and on-lock lever 205 and neither of the sliding part 206 and on-lock lever 205 is being operated. In this state, the sliding part 206 is halted in the rearmost position of its slidable range by the urging force of the spring 1077. At this time, the pawl part of the rear end 2061 is inserted into the through-hole 2211*a*, and the rear surface of the rear end 2061 is in contact with the front surface of the wall part 2211. The lever part 2053 of the on-lock lever 205 is also halted in its rightmost position within its pivotable range by the urging force of the torsion spring 2055 in the C2 direction (FIG. 12(*a*)). The position of the on-lock lever 205 at this time will be called the on-lock release position. The engaging part 2051 and engaging part 2063 are not engaged at this time.

Figure 11:
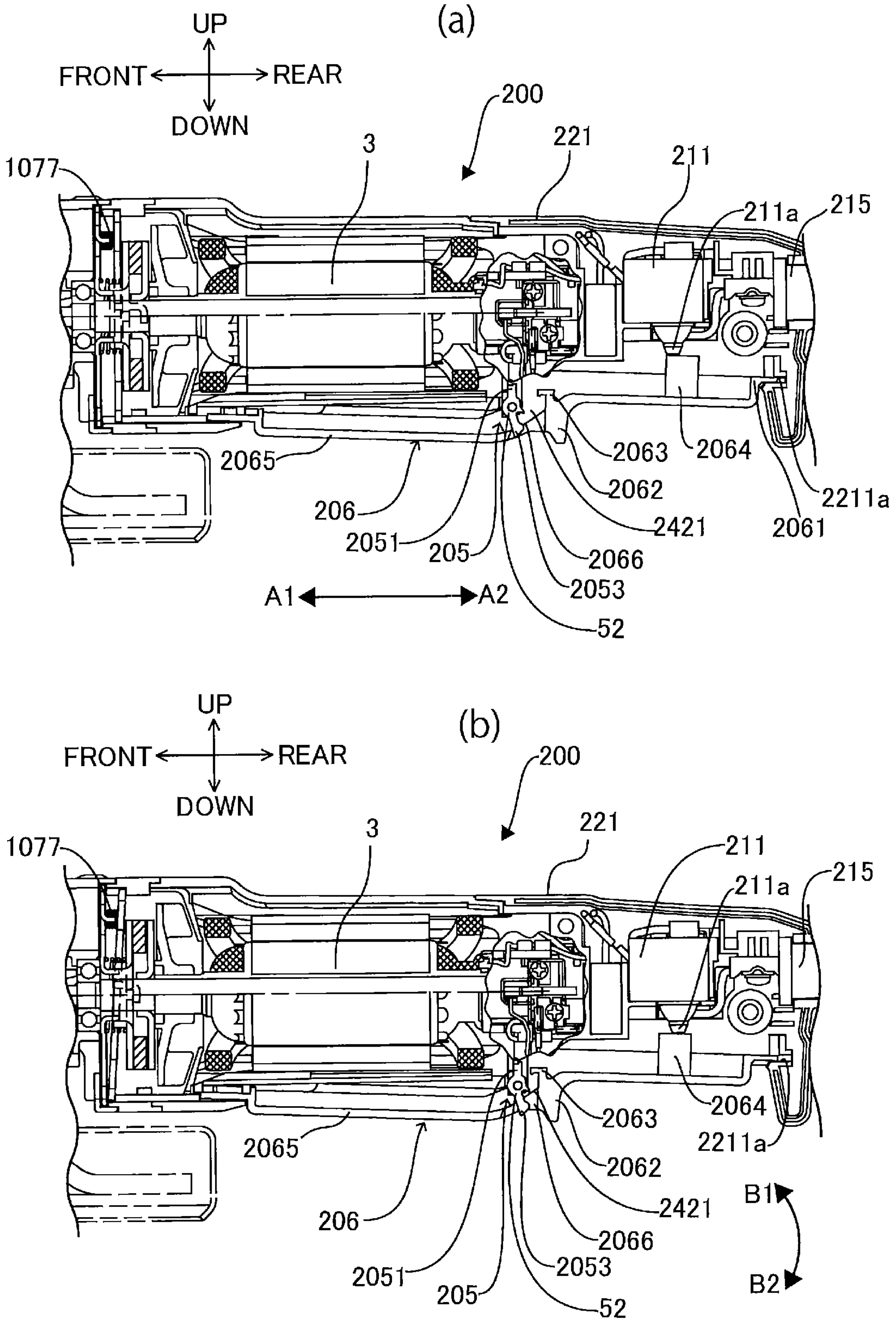
FIG. 11 is a view illustrating states where the disc grinder according to a third embodiment of the present invention is in an initial position and an off-lock releasing position, and (a) shows a state where a sliding part is in an off-lock position, and (b) shows a state where the sliding part is in the off-lock releasing position.

Even if the operator were to apply force to the sliding part 206 in the B1 direction while neither of the sliding part 206 and on-lock lever 205 is being operated (FIG. 11(*a*)), the pawl part of the rear end 2061 is configured to contact the inner circumferential surface forming the through-hole 2211*a* so that the flat part 2065 cannot pivot more than a prescribed angle. Accordingly, the protruding part 2064 does not press against the push button 211*a* that serves to drive the motor 3. The position of the sliding part 206 at this time will be called the off-lock position. Further, the position of the sliding part 206 when the flat part 2065 is in the position shown in FIG. 11(*a*) and the protruding part 2064 is not pressed against the push button 211*a* will be called the OFF position. When the sliding part 206 is in the OFF position, an internal space 2421 is formed at the same position as the through-hole 2066 in the front-rear direction and inside of the outer circumferential surface of the sliding part 206 (FIG. 11(*a*)).

When the sliding part 206 is in the OFF position as shown in FIG. 11(*a*), the entire lever part 2053 of the on-lock lever 205 is accommodated in the internal space 2421 (the housing 2). An external force cannot easily be applied to the lever part 2053 of the on-lock lever 205 at this time since the lever part 2053 is accommodated in the internal space 2421. Hence, the operator is prevented from operating the on-lock lever 205 and enabling the off-lock prior to operating the sliding part 206.

When the operator applies force to the grip part 2062 of the sliding part 206 in the A1 direction shown in FIG. 11(*a*) to slide the grip part 2062 forward, the entire pawl part of the rear end 2061 that was inserted into the through-hole 2211*a* becomes exposed to the outside. As a result, the pawl part of the rear end 2061 no longer vertically opposes the inner circumferential surface defining the through-hole 2211*a*, forming a prescribed vertical gap between the pawl part and the bottom surface of the tail cover 221, thereby enabling the flat part 2065 to pivot in the B1 direction. The position of the sliding part 206 shown in FIG. 11(*b*) when the pawl part of the rear end 2061 and the flat part 2065 are allowed to pivot in the B1 direction will be called the off-lock release position. At this time, no external force is being applied to the on-lock lever 205, and the on-lock lever 205 remains in the initial position. However, since the through-hole 2066 formed in the sloped surface on the bottom wall of the sliding part 206 moves forward relative to the lever part 2053 of the on-lock lever 205, the distal end of the lever part 2053 protrudes slightly out from the through-hole 2066. In other words, the amount that the lever part 2053 protrudes from the tail cover 221 in the disc grinder 200 is smaller when the sliding part 206 is in the off-lock position than when the sliding part 206 is in the off-lock release position. Therefore, this configuration suppresses the operator from unintentionally placing the sliding part 206 in the ON position when the sliding part 206 is in the off-lock position, thereby further enhancing usability. When the sliding part 206 of the disc grinder 200 is in the off-lock release position and the on-lock lever 205 is in the on-lock release position, the sliding part 206 can pivot in the B1 direction.

In the state of FIG. 11(*b*), when the operator applies force to the sliding part 206 in the B1 direction while continuing to exert force on the grip part 2062 of the sliding part 206 to maintain the sliding part 206 in the off-lock release position, the sliding part 206 pivots in the B1 direction about the distal end of the sliding part 206. Since no external force is being applied to the on-lock lever 205 at this time, the on-lock lever 205 remains in the initial position. The protruding part 2064 provided on the sliding part 206 moves upward as the sliding part 206 pivots in the B1 direction and presses against the push button 211*a* of the switch 211 to turn the switch 211 on. Accordingly, power is supplied from the external power supply to the motor 3 via the power cord 215, driving the motor 3 (FIG. 12(*a*)). The position of the sliding part 206 when the flat part 2065 is in the position shown in FIG. 12(*a*) and the switch 211 has been switched on by the protruding part 2064 will be called the ON position.

When the operator pivots the sliding part 206 in the B1 direction, the remaining portion of the lever part 2053 on the on-lock lever 205 accommodated in the internal space 2421 protrudes out through the through-hole 2066 of the sliding part 206 as the sliding part 206 pivots. Accordingly, the operator can operate the lever part 2053 (FIG. 12(*a*)).

Figure 12:
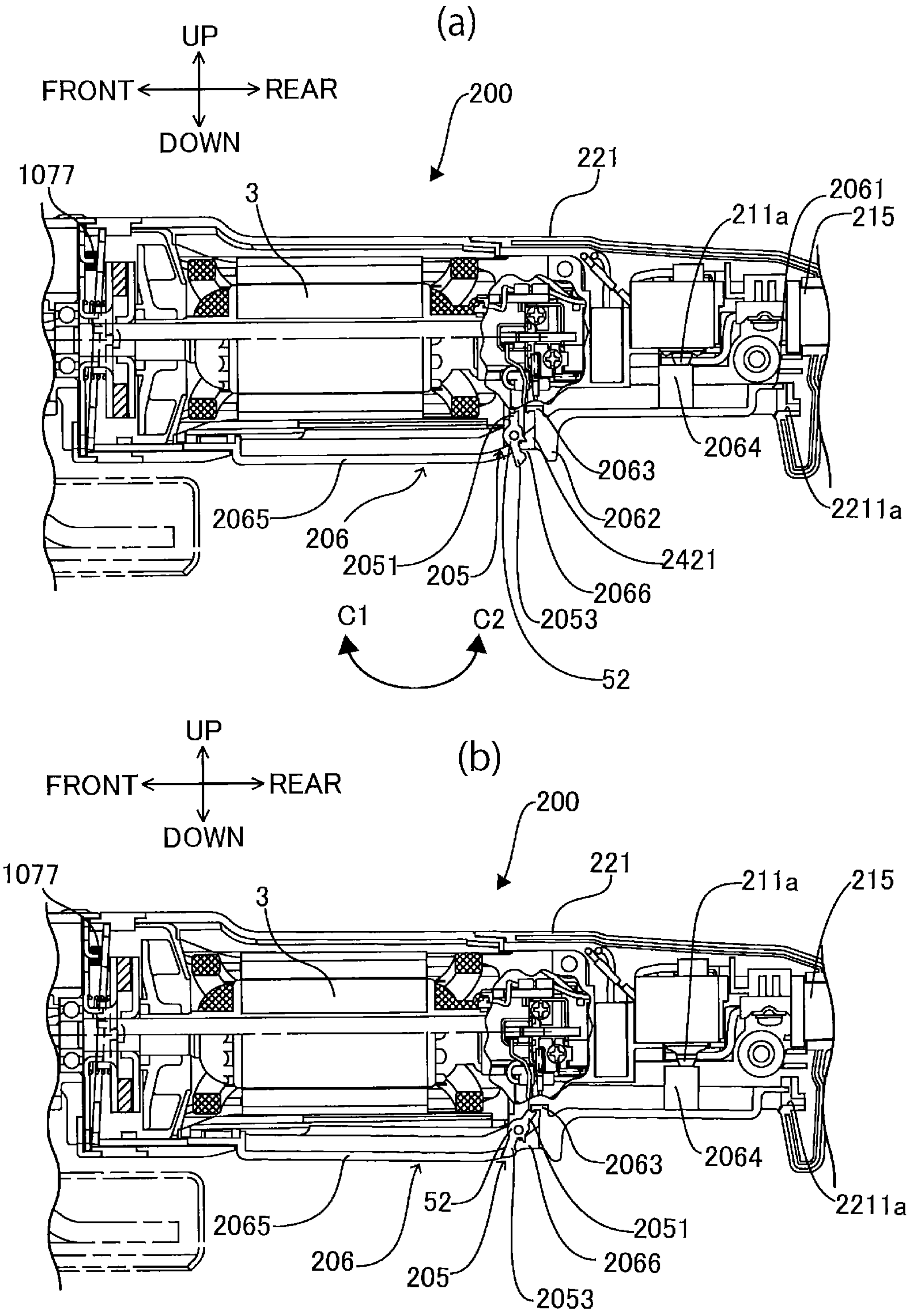
FIG. 12 is a view illustrating states where the disc grinder according to the third embodiment of the present invention is in the on position and the on-lock position, and (a) shows a state where the sliding part is in the on position, (b) shows a state where the sliding part is in the on position and the on-lock lever is in an on-lock position.

If the operator pivots the lever part 2053 about the rotational axis of the support part 52 for the on-lock lever 205 so that the lever part 2053 moves substantially forward relative to the sliding part 206 along the C1 direction in FIG. 12(*a*) (clockwise) while the sliding part 206 is maintained in the ON position shown in FIG. 12(*a*), the engaging part 2051 moves substantially rearward to become positioned beneath the pawl part of the engaging part 2063 (FIG. 12(*a*)). When the operator gradually lessens the gripping force on the flat part 2065 while holding the lever part 2053 with a finger against the urging force of the torsion spring 2055 so that the front surface of the lever part 2053 contacts the inner circumferential surface forming the through-hole 2066, the sliding part 206 pivots by its own weight in the B2 direction (clockwise) about a rotational axis (not shown). Accordingly, the pawl part of the engaging part 2063 provided on the sliding part 206 moves downward and engages with the pawl part of the engaging part 2051 (FIG. 12(*b*)). At this time, the magnitude of the weight of the sliding part 206 urging the sliding part 206 in the B2 direction to lower the engaging part 2063 provided on the sliding part 206 side is greater than the urging force of the torsion spring 2055 that urges the engaging part 2051 in the C2 direction. Consequently, even if the operator releases the lever part 2053 of the on-lock lever 205, the engagement between the engaging part 2051 and engaging part 2063 is maintained while the front surface of the lever part 2053 maintains contact with the inner circumferential surface forming the through-hole 2066. Hence, the pawl part of the engaging part 2051 and the pawl part of the engaging part 2063 do not disengage unless a prescribed external force is applied. The contact between the front surface of the lever part 2053 and the inner circumferential surface forming the through-hole 2066 owing to the engagement between the pawl part on the engaging part 2051 of the on-lock lever 205 supported in the tail cover 221 and the pawl part on the engaging part 2063 of the sliding part 206 stops the sliding part 206 from sliding in the A2 direction and pivoting in the B2 direction. The sliding part 206 is maintained in the ON position even if the operator releases the sliding part 206 at this time, and the motor 3 continues driving. The position of the on-lock lever 205 in this state will be called the on-lock position. At this time, the motor 3 is driving while operations of the on-lock lever 205 and sliding part 206 are both halted. This state will be called the on-lock state of the disc grinder 200.

Next, the operations performed when halting operation of the disc grinder 200 will be described. When the disc grinder 200 is in the on-lock state (FIG. 12(*b*)) and the operator grips the sliding part 206 and applies force to the flat part 2065 in the B1 direction, the engaging part 2063 provided on the sliding part 206 moves upward relative to the on-lock lever 205. Hence, the pawl part of the engaging part 2063 separates from the pawl part of the engaging part 2051, disengaging the two (FIG. 12(*a*)). Consequently, the urging force of the torsion spring 2055 pivots the lever part 2053 of the on-lock lever 205 in the C2 direction. The lever part 2053 pivots toward the on-lock release position and stops at the rightmost position within its pivotable range (FIG. 12(*a*)). By releasing the engagement between the pawl part of the engaging part 2063 and the pawl part of the engaging part 2051, the sliding part 206 can pivot in the B2 direction. When the operator releases the sliding part 206, the sliding part 206 pivots further in the B2 direction by its weight and stops moving in the OFF position (FIG. 11(*b*)). At the same time, the grip part 2062 of the sliding part 206 is slid in the A2 direction by the urging force of the spring 1077, and the pawl part of the rear end 2061 is inserted into the through-hole 2211*a*. The grip part 2062 comes to a halt at the rearmost position within its slidable range. The top surface of the protruding part 2064 also moves in a direction away from the push button 211*a* as the sliding part 206 pivots in the B2 direction. When the protruding part 2064 has moved a prescribed distance in the direction away from the push button 211*a*, i.e., when the separated distance reaches a prescribed magnitude, power supplied from the external power supply to the motor 3 via the power cord 215 is stopped, and the motor 3 stops driving. At this time, the drive of the motor 3 and operations of the sliding part 206 and on-lock lever 205 are halted (FIG. 11(*a*)). Note that the disc grinder according to the third embodiment of the present invention is merely an example of the power tool in the invention and is not limited to the embodiment described above. Various modifications and improvements may be made therein without departing from the spirit of the invention, the scope of which is defined by the attached claims. The third embodiment described above differs from the first and second embodiments in the timing at which the on-lock lever is exposed. Specifically, while the on-lock lever is exposed when the switch lever is moved to the ON position in the first and second embodiments, the on-lock lever 205 in the third embodiment is exposed when the off-lock is released. Since the on-lock lever 205 in this configuration is not exposed during the initial state prior to the off-lock being released, this configuration suppresses the operator from applying force to the on-lock lever 205 before turning on the motor 3, thereby suppressing the operator from placing the disc grinder 200 in the on-lock state unintentionally.

Next, a disc grinder 300 will be described as an example of the power tool according to a fourth embodiment of the present invention while referring to FIG. 13. The disc grinder 100 has essentially the same structure as the disc grinder 100 according to the second embodiment. Components identical to those in the disc grinder 100 are designated with the same reference numerals to avoid duplicating description. The following description will primarily cover different structures and structures that need to be described in greater detail. Structures identical to those of the disc grinder 100 obtain the same effects as described above.

Figure 13:
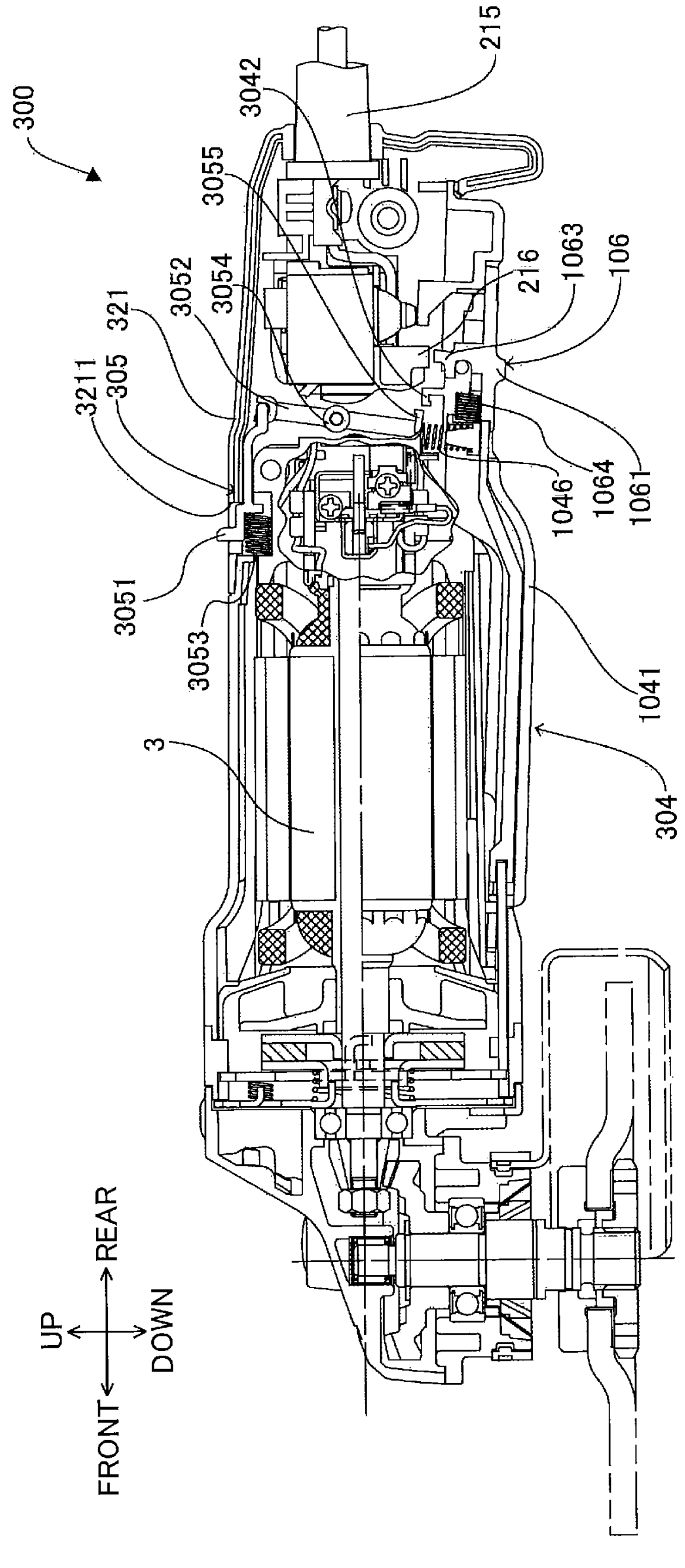
FIG. 13 is a cross-sectional view illustrating an internal structure of a disk grinder according to a fourth embodiment of the present invention.

As shown in FIG. 13, the disc grinder 300 according to the fourth embodiment is provided with a tail cover 321 in place of the tail cover 121. The tail cover 321 differs from the tail cover 121 in that a through-hole 3211 extending vertically is formed in the top surface of the tail cover 321 at a position to the rear of the motor 3. The disc grinder 300 according to the fourth embodiment is also provided with a switch lever part 304 in place of the switch lever part 104. The switch lever part 304 extends along the front-rear direction parallel to the motor housing 22 and the tail cover 321. An engaging part 3042 is provided on the top surface of the switch lever part 304 in place of the engaging part 1042. The engaging part 3042 extends upward from the surface of the switch lever part 304 at a position to the rear of the first protruding part 1043. A pawl part having an L-shape in a side view is provided on the distal end of the engaging part 3042. The disc grinder 300 according to the fourth embodiment is also provided with an on-lock part 305 in place of the on-lock lever 105.

As shown in FIG. 13, the on-lock part 305 has a sliding part 3051, an intermediate part 3052, and a spring 3053. The sliding part 3051 is supported in the tail cover 321 so as to be capable of sliding in the front-rear direction. The rear end of the sliding part 3051 is connected to the top end of the intermediate part 3052. The sliding part 3051 has a protrusion by which the operator operates the sliding part 3051. The protrusion of the sliding part 3051 protrudes upward through the through-hole 3211. The spring 3053 extends in the front-rear direction and is disposed below the through-hole 3211 and at a position in the front-rear direction between the sliding part 3051 and the inner wall of the tail cover 321. The spring 3053 urges the sliding part 3051 rearward. The intermediate part 3052 has a support part 3054, and an engaging part 3055. The support part 3054 is positioned in the center portion of the intermediate part 3052 relative to the vertical direction. The intermediate part 3052 is pivotably supported in the tail cover 321 via a rotational shaft inserted through a through-hole formed in the support part 3054. The engaging part 3055 is provided on the bottom end of the intermediate part 3052. The engaging part 3055 has a pawl part capable of engaging with the engaging part 3042. In the disc grinder 300 according to the fourth embodiment, the on-lock part 305 is disposed on a side of the motor 3 radially opposite that of the off-lock part 106. In other words, the on-lock part 305 is positioned on one side (top) of the rotational shaft of the motor 3, while the off-lock part 106 is disposed on the other side (bottom). This arrangement prevents the operator from confusing operations of the on-lock part 305 and off-lock part 106, thereby further enhancing usability.

Next, operations of the disc grinder 300 according to the fourth embodiment and operations of the on-lock part 305 and off-lock part 106 will be described with reference to FIGS. 8(*a*) through 9(*b*).

To operate the disc grinder 300, the operator grips the flat part 1041 of the switch lever part 304 with one hand and grips the lever part 1061 of the off-lock part 106 with the other hand. The state of the disc grinder 300 shown in FIG. 14(*a*) is the state in which no external force is being applied to the switch lever part 304, on-lock part 305, and off-lock part 106 and none of the switch lever part 304, on-lock part 305, and off-lock part 106 is being operated. In this state, the lever part 1061 of the off-lock part 106 is halted in the rearmost position within its slidable range by the urging force of the spring 1064. At this time, the top surface of the protrusion on the third protruding part 1063 vertically opposes the bottom surface of the anchoring part 216 on the tail cover 321 at a prescribed distance. In this initial state, the spring 1046 also urges the switch lever part 304 substantially downward relative to the tail cover 221 along the B2 direction (FIG. 14(*b*)) and is halted in the lowermost position within the pivotable range of the switch lever part 304. The sliding part 3051 of the on-lock part 305 is also halted in the rearmost position of its slidable range by the urging force of the spring 3053 in the C1 direction (FIG. 15(*a*)). The position of the on-lock part 305 at this time will be called the on-lock release position. The engaging part 3055 and the engaging part 3042 are not engaged at this time.

Figure 14:
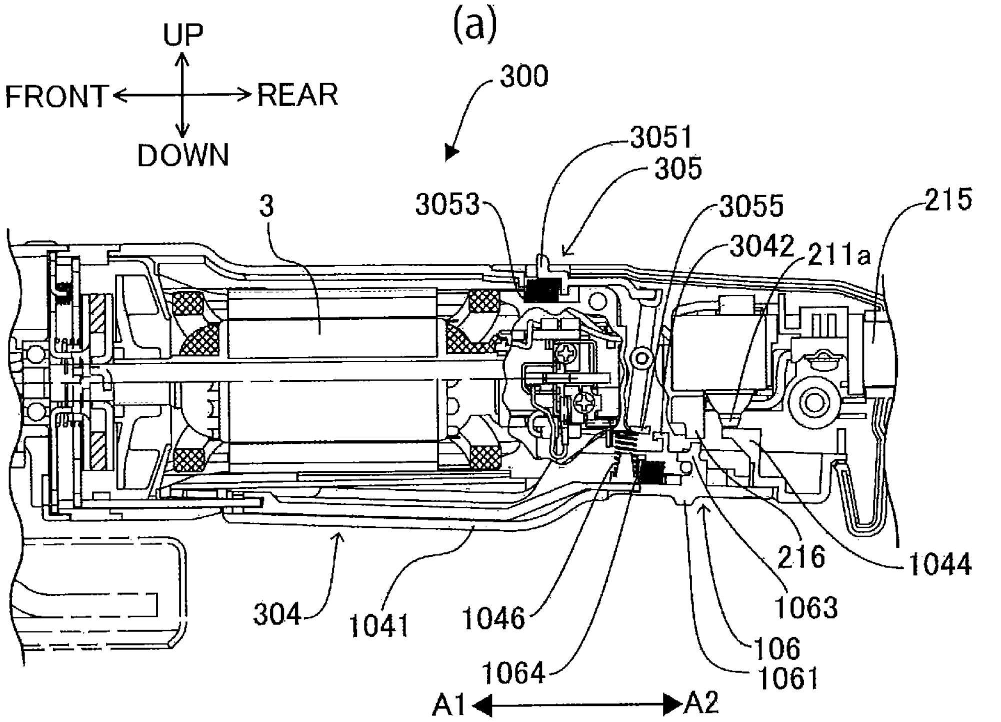
FIG. 14 is a view illustrating states where the disc grinder according to the fourth embodiment of the present invention is in an initial position and an off-lock releasing position, and (a) shows a state where an off-lock part is in an off-lock position, and (b) shows a state where the off-lock part is in the off-lock releasing position.
Figure 14:
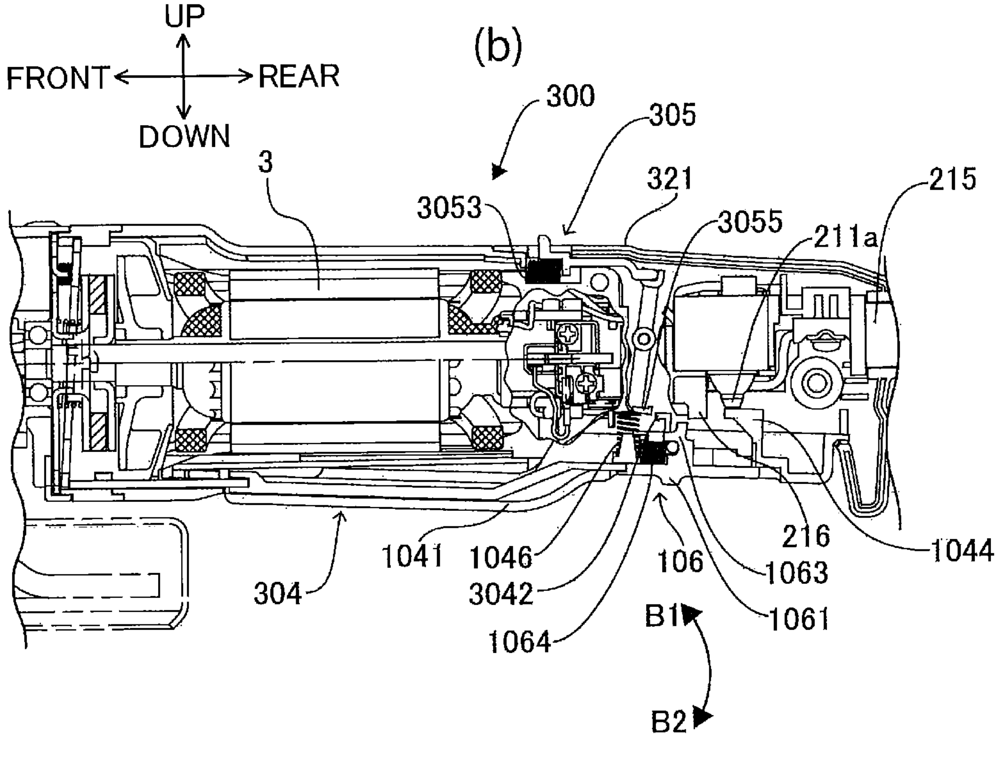

Even if the operator were to apply a force to the flat part 1041 of the switch lever part 304 in the B1 direction shown in FIG. 14(*b*) while none of the switch lever part 304, on-lock part 305, and off-lock part 106 is being operated, the top surface of the protrusion on the third protruding part 1063 is configured to contact the bottom surface of the anchoring part 216, preventing the flat part 1041 from pivoting more than a prescribed angle. Accordingly, the second protruding part 1044 does not press against the push button 211*a* that serves to drive the motor 3. The position of the off-lock part 106 at this time will be called the off-lock position. Further, the position of the switch lever part 304 when the flat part 1041 is in the position shown in FIG. 14(*a*)

and the second protruding part 1044 is not pressing against the push button 211*a* will be called the OFF position.

When the operator applies force to the lever part 1061 of the off-lock part 106 in the A1 direction of FIG. 14(*a*) to slide the lever part 1061 forward, the third protruding part 1063 provided on the lever part 1061 slides forward relative to the anchoring part 216. As a result, the top end of the third protruding part 1063 no longer confronts the anchoring part 216 vertically, and the flat part 1041 can pivot in the B1 direction. At this time, the switch lever part 304 and on-lock part 305 remain in their initial positions while no force is applied to the same. The position of the off-lock part 106 shown in FIG. 14(*b*) when the top end of the third protruding part 1063 no longer opposes the anchoring part 216 vertically and the flat part 1041 is allowed to pivot in the B1 direction will be called the off-lock release position. When the off-lock part 106 of the disc grinder 300 is in the off-lock release position and the on-lock part 305 is in the on-lock release position, the flat part 1041 of the switch lever part 304 can pivot in the B1 direction.

In the state of FIG. 14(*b*), when the operator applies force to the switch lever part 304 in the B1 direction while continuing to exert force on the lever part 1061 of the off-lock part 106 against the urging force of the spring 1064 in order to maintain the off-lock part 106 in the off-lock release position, the flat part 1041 pivots in the B1 direction. At this time, no external force is being applied to the on-lock part 305, and the on-lock part 305 remains in the initial position. The second protruding part 1044 provided on the switch lever part 304 moves upward as the flat part 1041 pivots in the B1 direction and presses against the push button 211*a* of the switch 211. Accordingly, power is supplied from the external power supply to the motor 3 via the power cord 215, driving the motor 3 (FIG. 15(*a*)). The position of the switch lever part 304 when the flat part 1041 is in the position shown in FIG. 15(*a*) and the second protruding part 1044 is pressed against the push button 211*a* will be called the ON position.

Figure 15:
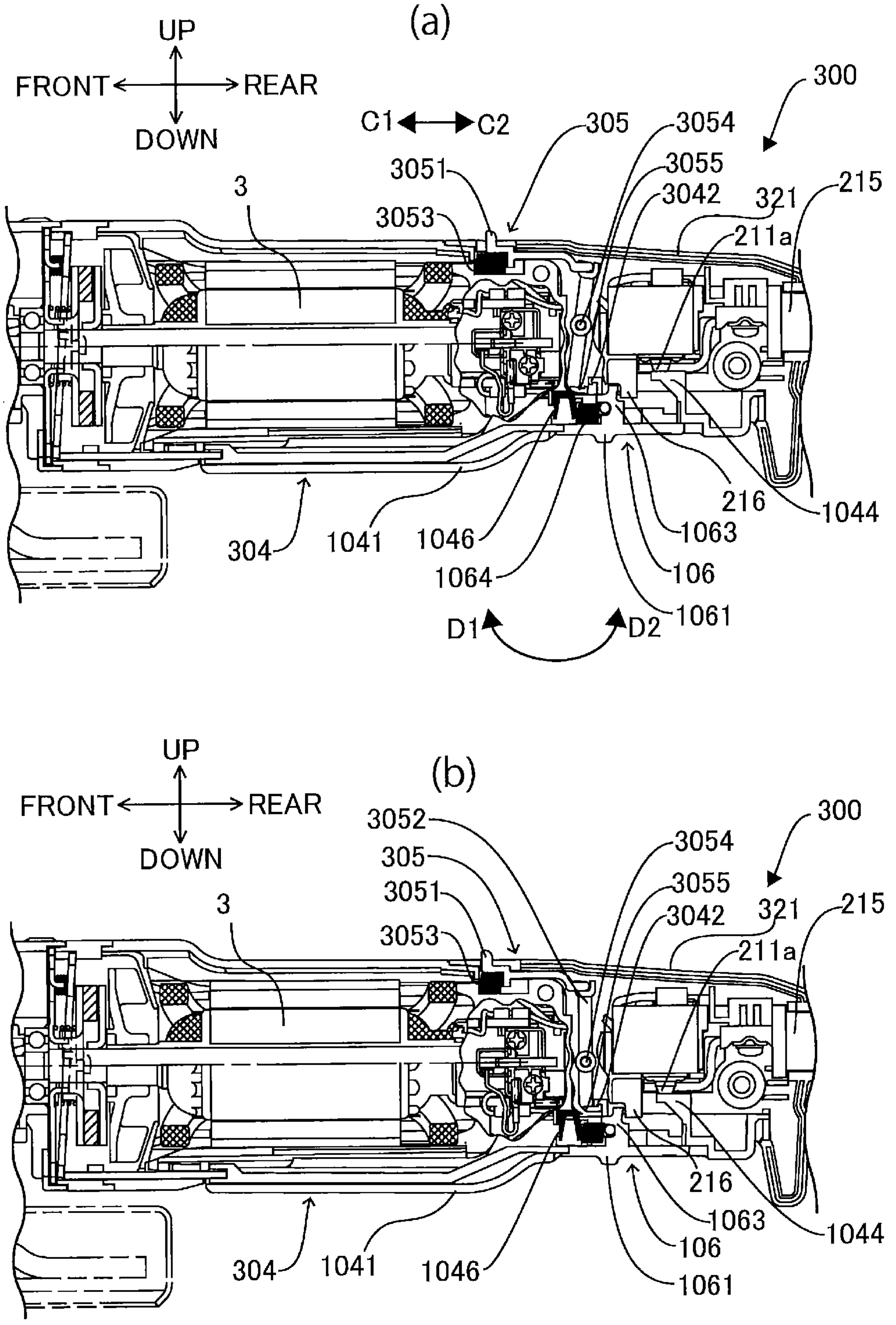
FIG. 15 is a view illustrating states where the disc grinder according to the fourth embodiment of the present invention is in an on position and an on-lock position, and (a) shows a state where a switch lever part is in the on position, and (b) shows a state where the switch lever part is in the on position and the on-lock part is in the on-lock position.

When the operator slides the sliding part 3051 of the on-lock part 305 in the C1 direction (forward) of FIG. 15(*a*) while the switch lever part 304 is maintained in the ON position shown in FIG. 15(*a*), the engaging part 3055 of the intermediate part 3052 connected to the rear end of the sliding part 3051 pivots in a D2 direction (FIG. 15(*a*)) about the rotational axis of the support part 3054. As a result, the engaging part 3055 provided on the intermediate part 3052 moves substantially rearward to become positioned beneath the pawl part of the engaging part 3042. At this time, the top surface of the protrusion on the third protruding part 1063 is positioned higher than the bottom surface of the anchoring part 216, and the protrusion on the third protruding part 1063 is positioned forward of the anchoring part 216 by a prescribed distance. If the operator gradually lessens the gripping force on the flat part 1041 while holding the sliding part 3051 with a finger against the urging force of the spring 3053 to maintain the sliding part 3051 in the frontmost position of its slidable range, the switch lever part 304 is pivoted in the B2 direction (clockwise) about a rotational axis (not shown) by the urging force of the spring 1046. Accordingly, the pawl part of the engaging part 3042 provided on the switch lever part 304 moves downward and engages with the pawl part on the engaging part 3055 (FIG. 15(*b*)). At this time, the urging force of the spring 1046 that urges the switch lever part 304 in the B2 direction to lower the engaging part 3042 provided on the switch lever part 304 side is greater than the urging force of the spring 3053 that urges the engaging part 3055 substantially forward relative to the tail cover 321. Consequently, even if the operator releases the sliding part 3051 of the on-lock part 305, the engagement between the engaging part 3055 and engaging part 3042 is maintained, i.e., the pawl part on the engaging part 3055 and the pawl part on the engaging part 3042 do not disengage unless a prescribed force is applied. The switch lever part 304 is stopped from pivoting in the B2 direction by this engagement between the pawl part on the engaging part 3055 of the on-lock part 305, supported in the tail cover 321, and the pawl part on the engaging part 3042 of the switch lever part 304. When the operator releases the lever part 1061, the rear surface of the protrusion on the third protruding part 1063 contacts the front surface of the anchoring part 216 and stops the off-lock part 106 from sliding rearward at this time. Further, the switch lever part 304 is maintained in the ON position when the operator releases the switch lever part 304, and the motor 3 continues driving. The position of the on-lock part 305 in this state will be called the on-lock position. At this time, the motor 3 is driving while operations of the switch lever part 304, on-lock part 305 and off-lock part 106 are all halted. This state will be called the on-lock state of the disc grinder 300.

Next, the operations performed when halting operation of the disc grinder 300 will be described. When the disc grinder 300 is in the on-lock state (FIG. 15(*b*)) and the operator grips the switch lever part 304 and applies force to the flat part 1041 in the B1 direction, the engaging part 3042 provided on the switch lever part 304 moves upward relative to the on-lock part 305. Hence, the pawl part of the engaging part 3042 separates from the pawl part of the engaging part 3055, disengaging the two (FIG. 15(*a*)). Consequently, the urging force of the spring 3053 slides the sliding part 3051 of the on-lock part 305 in the C2 direction. The sliding part 3051 slides toward the on-lock release position and stops at the rearmost position within its slidable range (FIG. 15(*a*)). By releasing the engagement between the pawl part of the engaging part 3042 and the pawl part of the engaging part 3055, the switch lever part 304 can pivot in the B2 direction. When the operator releases the switch lever part 304, the switch lever part 304 pivots farther in the B2 direction owing to the urging force of the spring 1046, and movement of the switch lever part 304 is halted at the OFF position (FIG. 14(*b*)). Accordingly, the lever part 1061 of the off-lock part 106 is slid in the A2 direction by the urging force of the spring 1064 and comes to a halt in the rearmost position of its slidable range. The top surface of the second protruding part 1044 also moves in a direction away from the push button 211*a* as the switch lever part 304 pivots in the B2 direction. When the second protruding part 1044 has separated from the push button 211*a* by a prescribed distance, power supplied from the external power supply to the motor 3 via the power cord 215 is stopped, and the motor 3 stops driving. At this time, the drive of the motor 3 and operations of the switch lever part 304, on-lock part 305, and off-lock part 106 are all halted, placing the disc grinder 300 in its initial state (FIG. 14(*a*)). As described above, the fourth embodiment of the present invention enhances usability by arranging the on-lock part 305 forward from the off-lock part 106 while usability can be further enhanced by considering the arrangement of these parts.

REFERENCE SIGNS LIST

1, 100, 200, 300: disk grinder, 3: motor, 8: grinding wheel, 4: switch lever, 104, 304: switch lever part, 5, 105: on-lock lever, 305: on-lock part, 6: off-lock lever, 106: off-lock part, 206: sliding part

The invention claimed is:

1. A working machine comprising:
a motor;
a housing; comprising:
a main body accommodating the motor therein; and
an operating element movable between an ON position and an OFF position, the motor being driven when the operating element is in the ON position, the motor being stopped when the operating element is in the OFF position; and
an on-locking element capable of maintaining the motor in a driving state, the on-locking element being provided in the main body;
wherein the operating element is configured to change its position with respect to the on-locking element when the operating element moves between the ON position and the OFF position while not maintaining the motor in the driving state, and
wherein, before an operation to turn on the motor is performed on the operating element, at least a portion of the on-locking element is accommodated inside of the housing and is covered by the operating element so as not to be operable, and, when the operation to turn on the motor is performed on the operating element, the portion of the on-locking element is positioned outside of the housing and is exposed from the operating element such that the on-locking element becomes operable.

2. The working machine according to claim 1,
wherein the on-locking element protrudes from the operating element when the operating element is in the ON position, a protruding amount of the on-locking element protruding from the operating element when the operating part is in the ON position being greater than a protruding amount of the on-locking element protruding from the operating element when the operating part is in the OFF position.

3. The working machine according to claim 1,
wherein the operating element moves from the OFF position to the ON position by being operated from one side toward another side in a prescribed direction, and
wherein the on-locking element protrudes from the operating element on the one side in the prescribed direction when the operating element is in the ON position.

4. A working machine comprising:
a housing;
a motor accommodated in the housing;
an operating element which is a part of the housing, the operating element being movable between an ON position and an OFF position, the motor being driven when the operating element is in the ON position, the motor being stopped when the operating element is in the OFF position, the operating element being switchable between a restricted state and a permitted state, movement of the operating element from the OFF position to the ON position being restricted when the operating element is in the restricted state and movement of the operating element from the OFF position to the ON position being permitted when the operating element is in the permitted state; and
an on-locking element provided in the housing so as to be movable between an on-lock position and an on-lock release position, the on-locking element maintaining the operating element in the ON position when the on-locking element is in the on-lock position, the on-locking element allowing the operating element to be movable when the on-locking element is in the on-lock release position;
wherein the movement of the operating element from the OFF position to the ON position moves the operating element relative to the on-locking element, and
wherein the on-locking element is more exposed from the housing when the operating element is in the permitted state than when the operating element is in the restricted state, such that the on-locking element becomes operable by an operator when the operating element is in the permitted state.

5. The working machine according to claim 4, further comprising a shielding part configured to move relative to the housing as the operating element is switched between the restricted state and the permitted state, the shielding part being configured to cover at least a portion of the on-locking element when the operating element is in the restricted state,
wherein the housing comprises a main body accommodating the motor therein,
wherein the operating element is movable relative to the main body, and
wherein the shielding part moves relative to the main body and the on-locking element as the operating element is switched from the restricted state to the permitted state, and a part of the covered portion of the on-locking element covered by the shielding part when the operating element is in the restricted state is exposed when the operating element is in the permitted state.

6. The working machine according to claim 5, wherein a portion of the on-locking element protrudes outward from the shielding part when the operating element is in the permitted state.

7. The working machine according to claim 5, wherein the operating element has the shielding part.

8. The working machine according to claim 5, wherein the shielding part is formed with a through-hole, the portion of the on-locking element protruding outward from the shielding part through the through-hole when the operating element is in the permitted state.

9. The working machine according to claim 5, further comprising an off-locking element supported by the housing so as to be movable between an off-lock position and an off-lock release position relative to the main body, the off-locking element placing the operating element in the restricted state when the off-locking element is in the off-lock position, the off-locking element placing the operating element in the permitted state when the off-locking element is in the off-lock release position,
wherein the shielding part moves relative to the main body and the on-locking element as the off-locking element moves relative to the main body.

10. The working machine according to claim 9, wherein the off-locking element is pivotally movably supported by the housing.

11. The working machine according to claim 9, wherein the off-locking element is slidably movably supported by the housing.

12. The working machine according to claim 9, wherein a moving direction of the off-locking element when the off-locking element moves from the off-lock release position toward the off-lock position is opposite to a moving direction of the on-locking element when the on-locking element moves from the on-lock release position toward the off-lock position.

13. The working machine according to claim 4, further comprising a switch provided in the main body, the switch being configured to receive an operation performed on the operating element by the operator, wherein the operating element is configured to move close to and away from the switch, the ON position is a position closest to the switch, and the OFF position is a position furthest away from the switch.

14. A working machine comprising:

a motor;

a housing; comprising:

a main body accommodating the motor therein;

an operating element movable between an ON position and an OFF position relative to the main body, the motor being driven when the operating element is in the ON position, the motor being stopped when the operating element is in the OFF position; and a shielding part configured to move relative to the main body as the operating element moves; and an on-locking element provided in the housing, the on-locking element being supported by the main body so as to be movable between an on-lock position and an on-lock release position relative to the main body, the on-locking element maintaining the operating element in the ON position when the on-locking element is in the on-lock position, the on-locking element releasing an on-lock to the operating element when the on-locking element is in the on-lock release position;

wherein the operating element is configured to be in the OFF position while not being operated by an operator and to be in the ON position when operated by the operator, and wherein, when the operating element is in the OFF position, the shielding part covers the on-locking element, making the on-locking element inoperable, and in a process of the operating element moving from the OFF position to the ON position, the shielding part moves relative to the main body and the on-locking element to expose the on-locking element from the shielding part, making the on-locking element operable.

15. The working machine according to claim 14, wherein the shielding part is configured to move in conjunction with the operating element, and the motor has a rotational shaft extending in a longitudinal direction.

* * * * *